(12) United States Patent
Yasugi et al.

(10) Patent No.: US 11,722,696 B2
(45) Date of Patent: Aug. 8, 2023

(54) CROSS-COMPONENT LINEAR MODEL PREDICTION IMAGE GENERATION APPARATUS, VIDEO DECODING APPARATUS, VIDEO CODING APPARATUS, AND PREDICTION IMAGE GENERATION METHOD

(71) Applicant: Sharp Kabushiki Kaisha, Sakai (JP)

(72) Inventors: Yukinobu Yasugi, Sakai (JP); Eiichi Sasaki, Sakai (JP); Tomohiro Ikai, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/867,736

(22) Filed: Jul. 19, 2022

(65) Prior Publication Data

US 2022/0368944 A1    Nov. 17, 2022

Related U.S. Application Data

(63) Continuation of application No. 17/413,677, filed as application No. PCT/JP2019/049451 on Dec. 17, 2019, now Pat. No. 11,451,825.

(30) Foreign Application Priority Data

Dec. 20, 2018 (JP) ................................ 2018-238526

(51) Int. Cl.
*H04N 19/593* (2014.01)
*H04N 19/105* (2014.01)
*H04N 19/186* (2014.01)
*H04N 19/80* (2014.01)

(52) U.S. Cl.
CPC ......... *H04N 19/593* (2014.11); *H04N 19/105* (2014.11); *H04N 19/186* (2014.11); *H04N 19/80* (2014.11)

(58) Field of Classification Search
None
See application file for complete search history.

(56) References Cited

U.S. PATENT DOCUMENTS

2021/0314581 A1* 10/2021 Ma ........................ H04N 19/196

FOREIGN PATENT DOCUMENTS

CN            105306944 A        2/2016

OTHER PUBLICATIONS

Yasugi et al., "Cross-Component Linear Model Prediction Image Generation Apparatus, Video Decoding Apparatus, Video Coding Apparatus, and Prediction Image Generation Method", U.S. Appl. No. 17/413,677, filed Jun. 14, 2021.

* cited by examiner

*Primary Examiner* — Stuart D Bennett
(74) *Attorney, Agent, or Firm* — Keating & Bennett, LLP

(57) ABSTRACT

The amount of memory required for CCLM prediction is reduced. The CCLM prediction parameter derivation unit (310442) derives a scale shift value corresponding to a luma difference value, and derives a CCLM prediction parameter, by shifting, by using the scale shift value, a value obtained by multiplying a value of a table referred to with a value obtained by performing right shift of the luma difference value by the scale shift value as an index and a chroma difference value. In addition, in a case of deriving a prediction image, a bit width is reduced by adaptively deriving a shift amount of a linear prediction parameter from the chroma difference value.

5 Claims, 18 Drawing Sheets

(a)　　　　(b)　　　　　　(c)　　　　　　　(d)

QT　　　　BT (VERTICAL SPLIT)　BT (HORIZONTAL SPLIT)

(e)　　　　　(f)

TT (VERTICAL SPLIT)　TT (HORIZONTAL SPLIT)

(g)

| qt_split_cu_flag | mtt_split_cu_flag | mtt_split_cu_vertical_flag | mtt_split_cu_binary_flag | |
|---|---|---|---|---|
| 1 | - | - | - | (b) |
| 0 | 1 | 1 | 1 | (c) |
| | | | 0 | (e) |
| | | 0 | 1 | (d) |
| | | | 0 | (f) |
| 0 | 0 | - | - | (a) |

CROSS-COMPONENT LINEAR MODEL PREDICTION IMAGE GENERATION APPARATUS, VIDEO DECODING APPARATUS, VIDEO CODING APPARATUS, AND PREDICTION IMAGE GENERATION METHOD

TECHNICAL FIELD

The embodiments of the present invention relate to a prediction image generation apparatus, a video decoding apparatus, a video coding apparatus, and a prediction image generation method.

BACKGROUND ART

A video coding apparatus which generates coded data by coding a video, and a video decoding apparatus which generates decoded images by decoding the coded data are used for efficient transmission or recording of videos.

For example, specific video coding schemes include H.264/AVC and High-Efficiency Video Coding (HEVC) schemes, and the like.

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction error components (which may be referred to also as "difference images" or "residual images") obtained by subtracting the prediction image from the input image are coded. Generation methods of prediction images include an inter-picture prediction (an inter-prediction) and an intra-picture prediction (intra prediction). Non Patent Literature (NPL) 1 is exemplified as a recent technique for video coding and decoding.

Furthermore, in recent video coding and a decoding technique, a Cross-Component Linear Model (CCLM) prediction for generating a prediction image of a chroma image from a luma image is known. In the CCLM prediction, a linear prediction parameter is derived using a decoded image adjacent to a target block, and chroma of the target block is predicted from the linear prediction model (CCLM model) (NPL 2).

CITATION LIST

Non Patent Literature

NPL 1: "Versatile Video Coding (Draft 3)", JVET-L1001, Joint Video Exploration Team (JVET) of ITU-T SG 16 WP 3 and ISO/IEC JTC 1/SC 29/WG 11, 2018-11-08 17:06:06

NPL 2: "CE3-5.1: On cross-component linear model simplification", JVET-L0191, Joint Video Exploration Team (JVET) of ITU-T SG 16 WP 3 and ISO/IEC JTC 1/SC 29/WG 11, 2018-10-03

SUMMARY OF INVENTION

Technical Problem

As described above, in the CCLM processing, the linear prediction parameter is derived, and the prediction image is generated using the linear prediction model. For the derivation of the linear prediction parameter, an integer operation and table reference are used, but there is a problem in that the amount of memory to be used of this table is large.

Furthermore, in a case of deriving a prediction value using a product of a gradient term of the linear prediction parameter (CCLM prediction parameter a) and a pixel value, there is a problem in the method of NPL 1 that since the bit width of the CCLM prediction parameter a increases, the complexity of the product is large. In addition, NPL 1 also uses a product for derivation of the gradient term (CCLM prediction parameter a) of the linear prediction parameter and an offset term (CCLM prediction parameter b) of the linear prediction parameter, but this product is also the product of values having a large bit width and thus is complex. Note that the product of values having a large bit width increases the hardware scale.

Solution to Problem

In order to solve the above-described problems, a CCLM prediction unit according to an aspect of the present invention is a CCLM prediction unit configured to generate a prediction image by a CCLM prediction, the CCLM prediction unit including: a CCLM prediction parameter derivation unit configured to derive CCLM prediction parameters (a, b) by using a luma difference value, a chroma difference value, and a table; and a CCLM prediction filter unit configured to generate a chroma prediction image by using a luma reference image and the CCLM prediction parameters (a, b), in which the CCLM prediction parameter derivation unit derives the CCLM prediction parameter a by perfroming right shift of a value obtained by multiplying a value of an inverse number table referred to by using the luma difference value and the chroma difference value by a first shift value shift_a, and the CCLM prediction filter unit derives the chroma prediction image by performing right shift of a product of the parameter a and luma by a second prescribed shift value shiftA.

Advantageous Effects of Invention

According to an aspect of the present invention, in a CCLM prediction, an effect in which multiplication with a linear prediction parameter is simplified is obtained.

DESCRIPTION OF EMBODIMENTS

First Embodiment

Hereinafter, embodiments of the present disclosure will be described with reference to the drawings.

Figure 1:
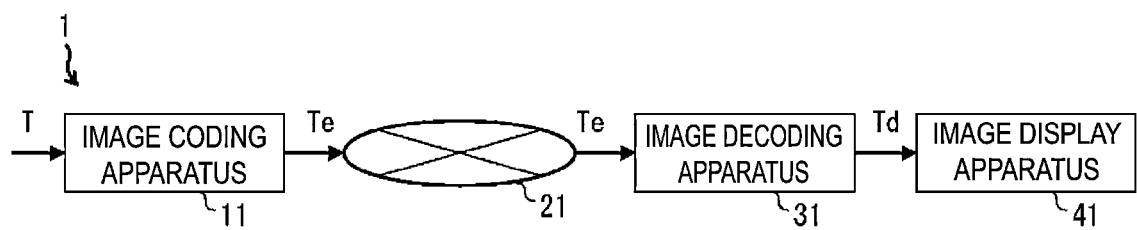
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting or the like. Furthermore, the network 21 may be substituted by a storage medium in which the coding stream Te is recorded, such as a Digital Versatile Disc (DVD: trade name) or a Blu-ray Disc (BD: trade name).

The video decoding apparatus 31 decodes each of the coding streams Te transmitted from the network 21 and generates one or multiple decoded images Td which are decoded.

The video display apparatus 41 displays all or part of the one or multiple decoded images Td generated by the video decoding apparatus 31. For example, the video display apparatus 41 includes a display device such as a liquid crystal display and an organic Electro-Luminescence (EL) display. Forms of the display include a stationary type, a mobile type, an HMD type, and the like. In addition, in a case that the video decoding apparatus 31 has a high processing capability, an image having high image quality is displayed, and in a case that the apparatus only has a lower processing capability, an image which does not require high processing capability and display capability is displayed.

Operator

Operators used in the present specification will be described below.

$>>$ is a right bit shift, $<<$ is a left bit shift, & is a bitwise AND, | is a bitwise OR, |= is an OR assignment operator, and || indicates a logical sum.

x?y:z is a ternary operator to take y in a case that x is true (other than 0) and take z in a case that x is false (0).

Clip3(a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs(a) is a function that returns the absolute value of a.

Int(a) is a function that returns the integer value of a.

floor(a) is a function that returns the maximum integer equal to or less than a.

ceil(a) is a function that returns the minimum integer equal to or greater than a.

a/d represents division of a by d (round down decimal places).

a^b represents a to the power of b.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
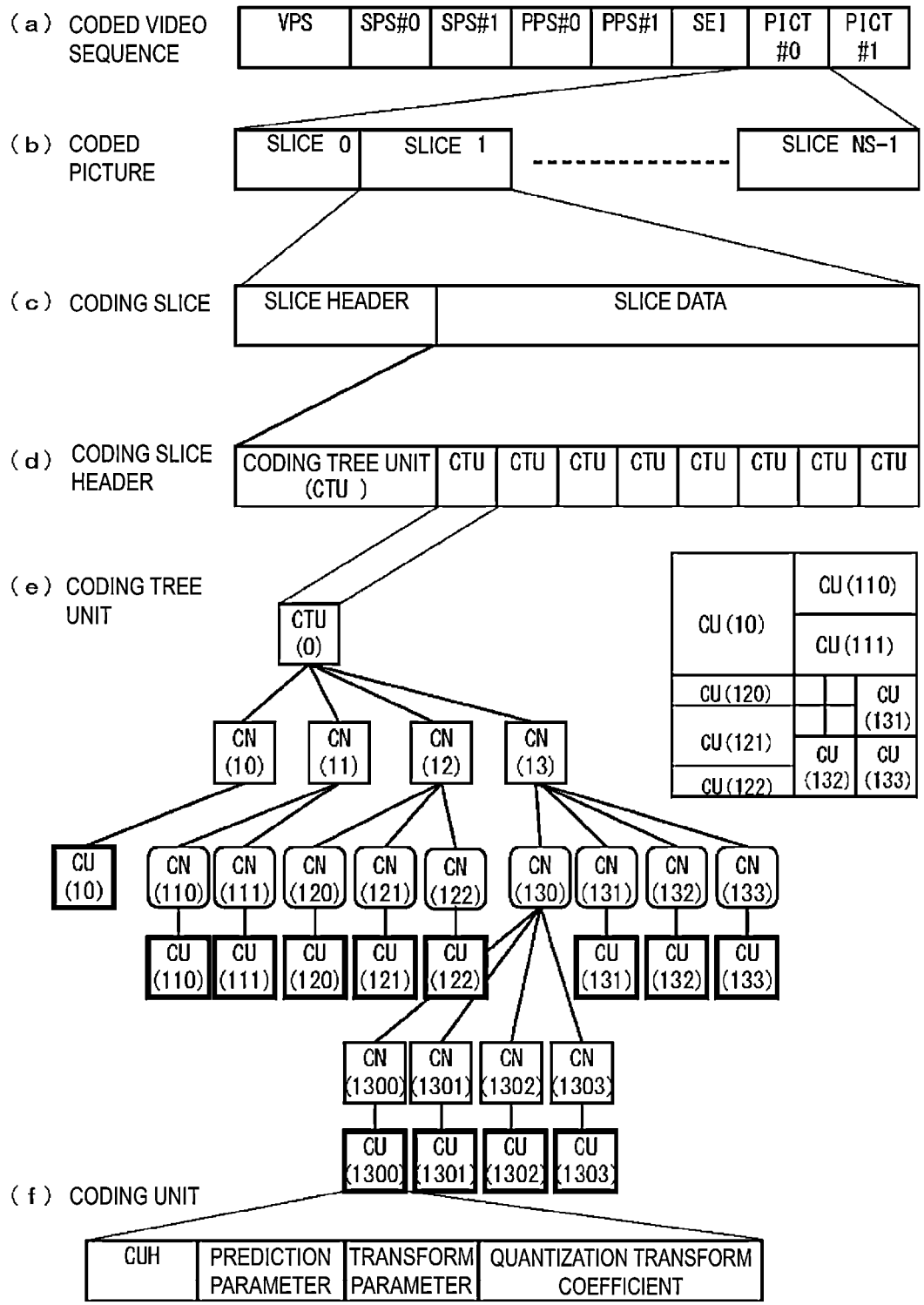
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. (a) to (f) of FIG. 4 are diagrams illustrating a coded video sequence defining a sequence SEQ, a coded picture prescribing a picture PICT, a coding slice prescribing a slice S, a coding slice data prescribing slice data, a coding tree unit included in the coding slice data, and a coding unit (CU) included in each coding tree unit, respectively.

Coded Video Sequence

In the coded video sequence, a set of data referred to by the video decoding apparatus 31 to decode the sequence SEQ to be processed is defined. As illustrated in FIG. 4(*a*), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coded Picture

In the coded picture, a set of data referred to by the video decoding apparatus 31 to decode the picture PICT to be processed is defined. As illustrated in FIG. 4(b), the picture PICT includes a slice 0 to a slice NS−1 (NS is the total number of slices included in the picture PICT).

Note that in a case that it is not necessary to distinguish each of the slice 0 to the slice NS-1 below, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in FIG. 4(c), the slice includes a slice header and a slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case that a slice is referred to as the P or B slice, the slice indicates a slice that includes a block in which the inter prediction can be used.

Note that, the slice header may include a reference to the picture parameter set PPS (pic_parameter_set_id).

Coding Slice Data

In the coding slice data, a set of data referred to by the video decoding apparatus 31 to decode the slice data to be processed is defined. The slice data include CTUs as illustrated in FIG. 4(d). The CTU is a block of a fixed size (for example, 64×64) constituting a slice, and may be called a Largest Coding Unit (LCU).

Coding Tree Unit

In FIG. 4(e), a set of data referred to by the video decoding apparatus 31 to decode the CTU to be processed is defined. The CTU is split into coding units CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a QT split flag (qt_split_cu_flag) indicating whether or not to perform the QT split, an MT split flag (mtt_split_cu_flag) indicating the presence or absence of the MT split, an MT split direction (mtt_split_cu_vertical_flag) indicating a split direction of the MT split, and an MT split type (mtt_split_cu_binary_flag) indicating a split type of the MT split. qt_split_cu_flag, mtt_split_cu_flag, mtt_split_cu_vertical_flag, and mtt_split_cu_binary_flag are transmitted for each coding node.

Figure 5:
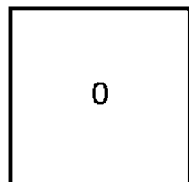
FIG. 5 is a diagram illustrating a split example of a CTU.
Figure 5:
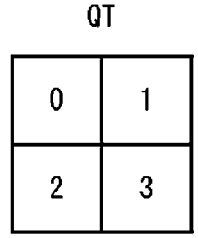
Figure 5:
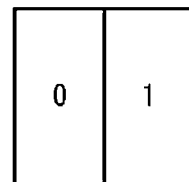
Figure 5:
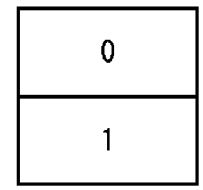
Figure 5:
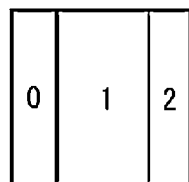
Figure 5:
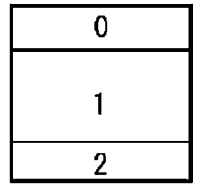

FIG. 5 is a diagram illustrating a split example of the CTU. In a case that qt_split_cu_flag is 1, the coding node is split into four coding nodes (FIG. 5(b)).

In a case that qt_split_cu_flag is 0, in a case that mtt_split_cu_flag is 0, the coding node is not split and has one CU as a node (FIG. 5(a)). The CU is an end node of the coding nodes and is not split any further. The CU is a basic unit of coding processing.

In a case that mtt_split_cu_flag is 1, the coding node is subjected to the MT split as described below. In a case that mtt_split_cu_vertical_flag 0 and mtt_split_cu_binary_flag is 1, the coding node is horizontally split into two coding nodes (FIG. 5(d)), and in a case that mtt_split_cu_vertical_flag is 1 and mtt_split_cu_binary_flag is 1, the coding node is vertically split into two coding nodes (FIG. 5(c)). Furthermore, in a case that mtt_split_cu_vertical_flag is 0 and mtt_split_cu_binary_flag is 0, the coding node is horizontally split into three coding nodes (FIG. 5(f)), and in a case that mtt_split_cu_vertical_flag is 1 and mtt_split_cu_binary_flag is 0, the coding node is vertically split into three coding nodes (FIG. 5(e)). These are illustrated in FIG. 5(g).

Furthermore, in a case that a size of the CTU is 64×64 pixels, a size of the CU may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 4(f), a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU obtained by further splitting the CU. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are an intra prediction and an inter prediction. The intra prediction refers to a prediction in an identical picture, and the inter prediction refers to prediction processing performed between different pictures (for example, between pictures of different display times).

Transform and quantization processing is performed in units of CU, but the quantization transform coefficient may be subjected to entropy coding in units of subblock such as 4×4.

Prediction Parameter

A prediction image is derived by a prediction parameter accompanying a block. The prediction parameter includes prediction parameters of the intra prediction and the inter prediction.

Figure 6:
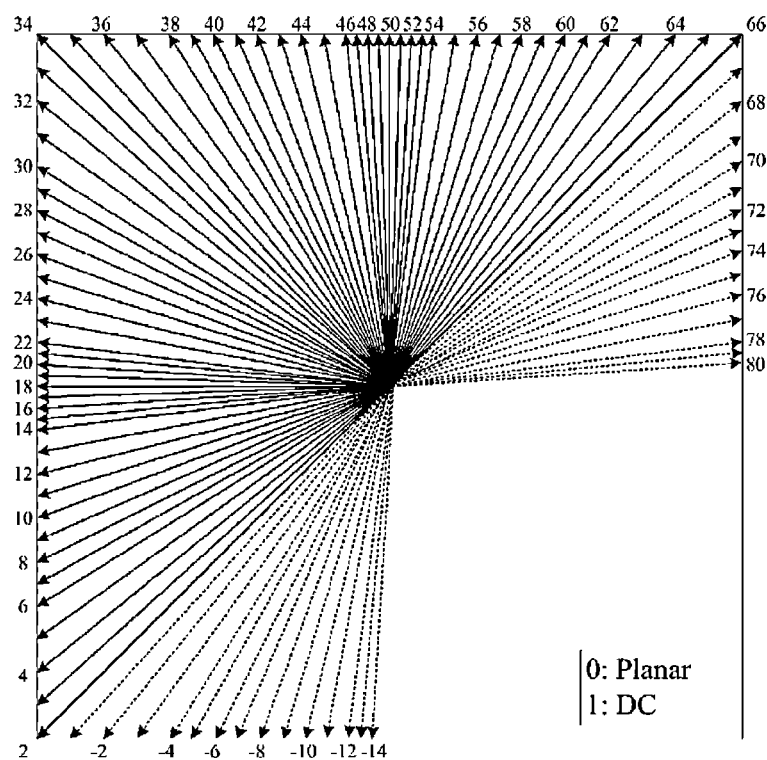
FIG. 6 is a schematic diagram indicating types (mode numbers) of an intra prediction mode.

The prediction parameter of the intra prediction will be described below. The intra prediction parameter includes a luma prediction mode IntraPredModeY and a chroma prediction mode IntraPredModeC. FIG. 6 is a schematic diagram indicating types (mode numbers) of the intra prediction mode. As illustrated in the diagram, for example, there are 67 types (0 to 66) of intra prediction modes. For example, a planar prediction (0), a DC prediction (1), and Angular predictions (2 to 66) are present. Furthermore, for chroma, CCLM modes (81 to 83) may be added.

Examples of a syntax element for deriving the intra prediction parameter include intra_luma_mpm_flag, mpm_idx, mpm_remainder, and the like.

MPM intra_luma_mpm_flag is a flag indicating whether or not the luma prediction mode IntraPredModeY and the Most Probable Mode (MPM) of the target block match. The MPM is a prediction mode included in an MPM candidate list mpmCandList[ ]. The MPM candidate list is a list in which a candidate that is inferred to have a high probability of being applied to a target block is stored, from the intra prediction mode of a neighbouring block and a prescribed intra prediction mode. In a case that intra_luma_mpm_flag is 1, the luma prediction mode IntraPredModeY of the target block is derived using the MPM candidate list and the index mpm_idx.

$$IntraPredModeY=mpmCandList[mpm\_idx]$$

REM

In a case that intra_luma_mpm_flag is 0, the luma prediction mode IntraPredModeY is derived using mpm_remainder. Specifically, the intra prediction mode is selected from remaining modes RemIntraPredModes other than the intra prediction mode included in the MPM candidate list from the all intra prediction modes.

Configuration of Video Decoding Apparatus

Figure 7:
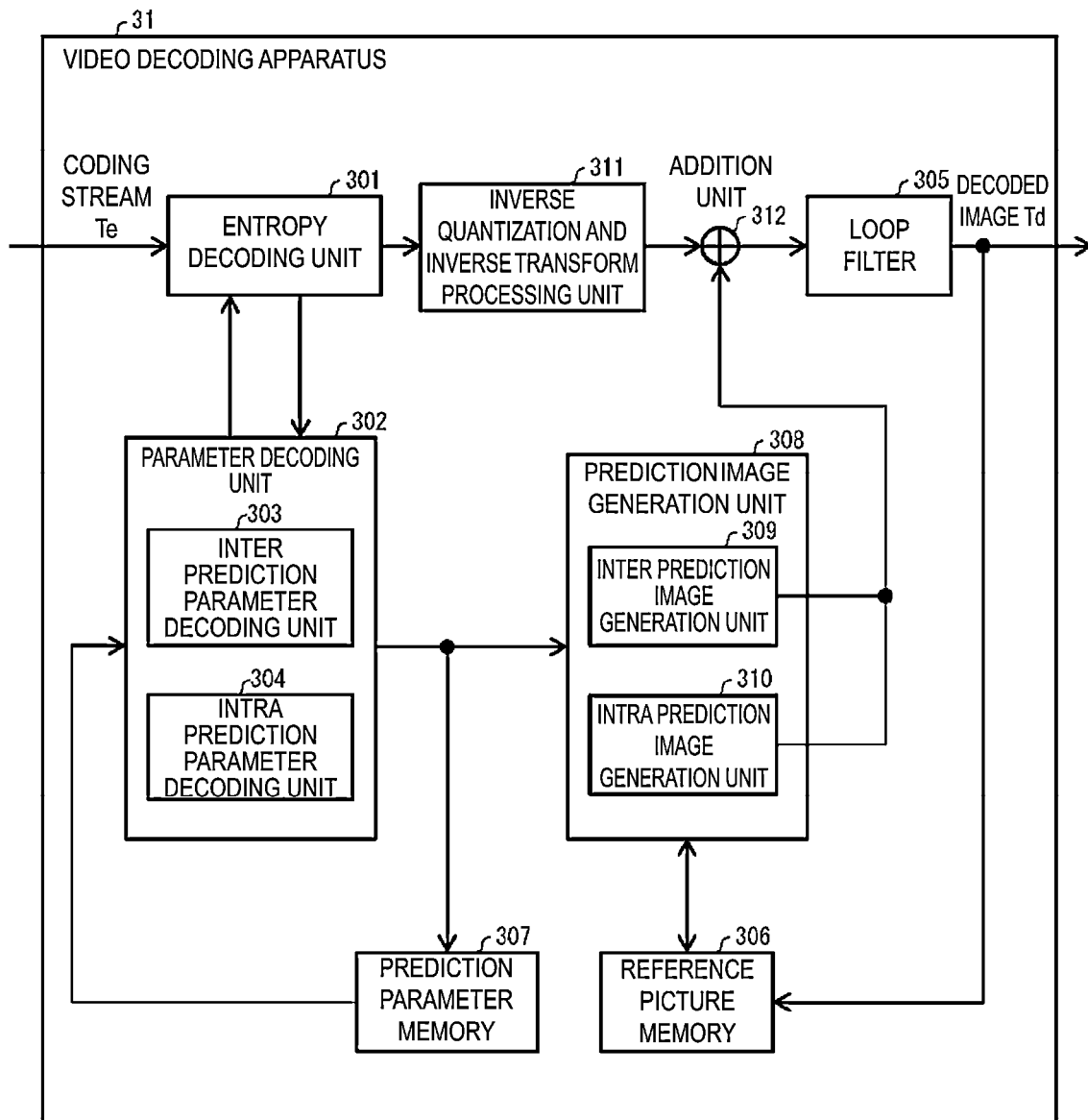
FIG. 7 is a schematic diagram illustrating a configuration of the video decoding apparatus.

A configuration of the video decoding apparatus 31 (FIG. 7) according to the present embodiment will be described.

The video decoding apparatus 31 includes an entropy decoding unit 301, a parameter decoding unit (prediction image decoding apparatus) 302, a loop filter 305, a reference picture memory 306, a prediction parameter memory 307, a prediction image generation unit 308, an inverse quantization and inverse transform processing unit 311, and an addition unit 312. Note that a configuration in which the loop filter 305 is not included in the video decoding apparatus 31 is also used in accordance with the video coding apparatus 11 described later.

The parameter decoding unit 302 further includes a header decoding unit 3020, a CT information decoding unit 3021, and a CU decoding unit 3022 (prediction mode decoding unit), and the CU decoding unit 3022 further includes a TU decoding unit 3024. These may be collectively referred to as a decoding module. The header decoding unit 3020 decodes, from coded data, parameter set information such as the VPS, the SPS, and the PPS, and a slice header (slice information). The CT information decoding unit 3021 decodes a CT from coded data. The CU decoding unit 3022 decodes a CU from coded data. In a case that a TU includes a prediction error, the TU decoding unit 3024 decodes QP update information (quantization correction value) and a quantization prediction error (residual_coding) from coded data.

In addition, the parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

Furthermore, an example in which a CTU and a CU are used as units of processing is described below, but the processing is not limited to this example, and processing in units of sub-CU may be performed. Alternatively, by replacing the CTU and the CU by a block and replacing the sub-CU by a subblock, and processing in units of blocks or subblocks may be performed.

The entropy decoding unit 301 performs entropy decoding on the coding stream Te input from the outside and separates and decodes individual codes (syntax elements). The separated codes include prediction information to generate a prediction image, a prediction error to generate a difference image, and the like. The entropy decoding unit 301 outputs the separated codes to the parameter decoding unit 302.

Configuration of Intra Prediction Parameter Decoding Unit 304

The intra prediction parameter decoding unit 304 decodes an intra prediction parameter, for example, an intra prediction mode IntraPredMode, with reference to a prediction parameter stored in the prediction parameter memory 307, based on the code input from the entropy decoding unit 301. The intra prediction parameter decoding unit 304 outputs a decoded intra prediction parameter to the prediction image generation unit 308, and also stores the decoded intra prediction parameter in the prediction parameter memory 307. The intra prediction parameter decoding unit 304 may derive different intra prediction modes depending on luma and chroma.

Figure 8:
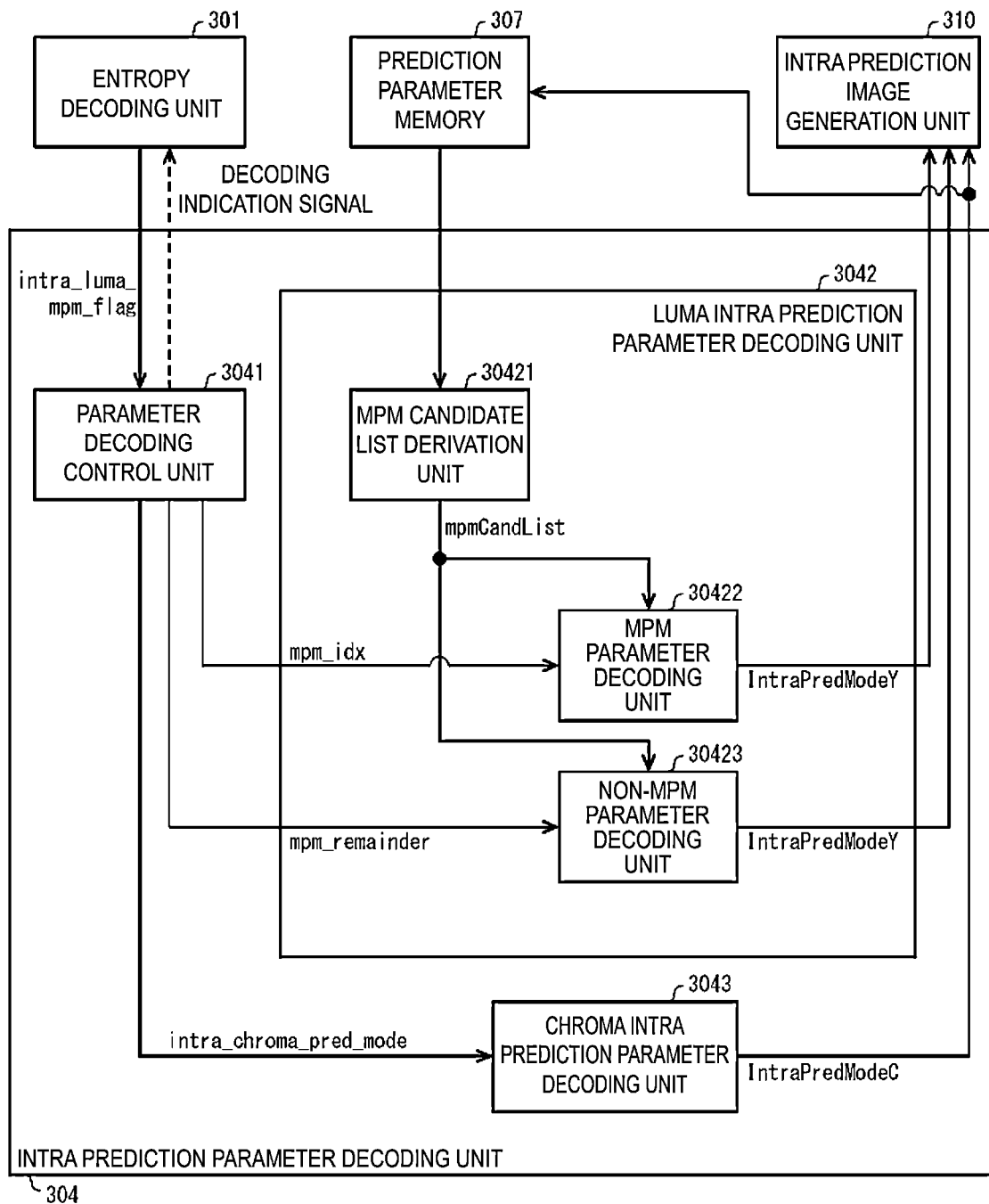
FIG. 8 is a schematic diagram illustrating a configuration of an intra prediction parameter decoding unit.

FIG. 8 is a schematic diagram illustrating a configuration of the intra prediction parameter decoding unit 304 of the parameter decoding unit 302. As illustrated in the diagram, the intra prediction parameter decoding unit 304 is configured to include a parameter decoding control unit 3041, a luma intra prediction parameter decoding unit 3042, and a chroma intra prediction parameter decoding unit 3043.

The parameter decoding control unit 3041 indicates to the entropy decoding unit 301 to decode a syntax element, and receives the syntax element from the entropy decoding unit 301. In a case that intra_luma_mpm_flag therein is 1, the parameter decoding control unit 3041 outputs mpm_idx to an MPM parameter decoding unit 30422 in the luma intra prediction parameter decoding unit 3042. Furthermore, in a case that intra_luma_mpm_flag is 0, the parameter decoding control unit 3041 outputs mpm_remainder to a non-MPM parameter decoding unit 30423 in the luma intra prediction parameter decoding unit 3042. Furthermore, the parameter decoding control unit 3041 outputs a chroma intra prediction parameter intra_chroma_pred_mode to the chroma intra prediction parameter decoding unit 3043.

The luma intra prediction parameter decoding unit 3042 is configured to include an MPM candidate list derivation unit 30421, the MPM parameter decoding unit 30422, and the non-MPM parameter decoding unit 30423 (a decoding unit, a derivation unit).

The MPM parameter decoding unit 30422 derives the luma prediction mode IntraPredModeY with reference to the MPM candidate list mpmCandList[ ] derived by the MPM candidate list derivation unit 30421 and mpm_idx, and outputs the derived mode to the intra prediction image generation unit 310.

The non-MPM parameter decoding unit 30423 derives IntraPredModeY from the MPM candidate list mpmCandList[ ] and mpm_remainder, and outputs the derivation result to the intra prediction image generation unit 310.

The chroma intra prediction parameter decoding unit 3043 derives the chroma prediction mode IntraPredModeC from intra_chroma_pred_mode and outputs the derived mode to the intra prediction image generation unit 310.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores the decoded image of the CU generated by the addition unit 312 in a predetermined position for each target picture and target CU.

The prediction parameter memory 307 stores a prediction parameter in a predetermined position for each CTU or CU to be decoded. Specifically, the prediction parameter memory 307 stores a parameter decoded by the parameter decoding unit 302, a prediction mode predMode separated by the entropy decoding unit 301, and the like.

The prediction image generation unit 308 receives input of the prediction mode predMode, the prediction parameter, and the like. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to to generate a prediction image.

Intra Prediction Image Generation Unit 310

In a case that the prediction mode predMode indicates an intra prediction mode, the intra prediction image generation unit 310 performs an intra prediction by using an intra prediction parameter input from the intra prediction parameter decoding unit 304 and a reference pixel read from the reference picture memory 306.

Specifically, the intra prediction image generation unit 310 reads, from the reference picture memory 306, a neighbouring block in a predetermined range from a target block on a target picture. The predetermined range is neighbouring blocks on the left, the top left, the top, and the top right of the target block, and the region referred to is different depending on the intra prediction mode.

The intra prediction image generation unit 310 generates a prediction image of the target block with reference to the read decoded pixel value and the prediction mode indicated by IntraPredMode. The intra prediction image generation unit 310 outputs the generated prediction image of the block to the addition unit 312.

The generation of the prediction image based on the intra prediction mode will be described below. In the Planar prediction, the DC prediction, and the Angular prediction, a decoded peripheral region adjacent to (proximate to) the prediction target block is configured as a reference region R. Then, the pixels on the reference region R are extrapolated in a specific direction to generate the prediction image. For example, the reference region R may be configured as an L-shaped region (e.g., the region indicated by the hatched circle in FIG. 9(a)) including the left and top (or further, top left, top right, bottom left) of the prediction target block.

Details of Prediction Image Generation Unit

Figure 10:
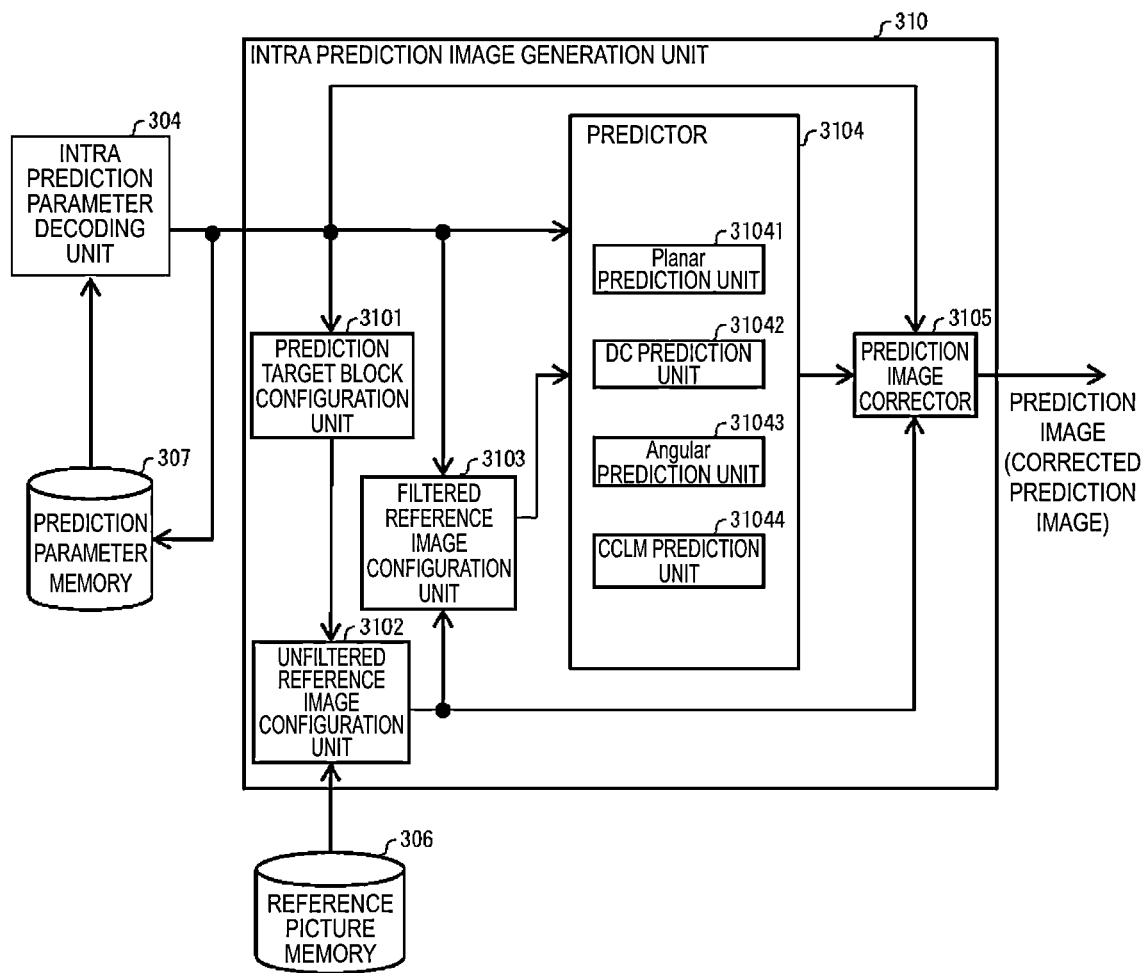
FIG. 10 is a diagram illustrating a configuration of an intra prediction image generation unit.

Next, the configuration of the intra prediction image generation unit 310 will be described in detail using FIG. 10. The intra prediction image generation unit 310 includes a prediction target block configuration unit 3101, an unfiltered reference image configuration unit 3102 (first reference image configuration unit), a filtered reference image configuration unit 3103 (second reference image configuration unit), a predictor 3104, and a prediction image corrector 3105 (prediction image corrector, filter switching unit, weight coefficient changing unit).

Based on each reference pixel (unfiltered reference image) on the reference region R, a filtered reference image generated by applying a reference pixel filter (first filter), and the intra prediction mode, the predictor 3104 generates a temporary prediction image (uncorrected prediction image) of the prediction target block, and outputs the generated image to the prediction image corrector 3105. The prediction image corrector 3105 corrects the temporary prediction image in accordance with the intra prediction mode, generates and outputs a prediction image (corrected prediction image).

Hereinafter, the units included in the intra prediction image generation unit 310 will be described.

Prediction Target Block Configuration Unit 3101

The prediction target block configuration unit 3101 configures the target CU to the prediction target block, and outputs information on the prediction target block (prediction target block information). The prediction target block information includes at least the size, the position, and an index indicating the luma or chroma of the prediction target block.

Unfiltered Reference Image Configuration Unit 3102

Figure 9:
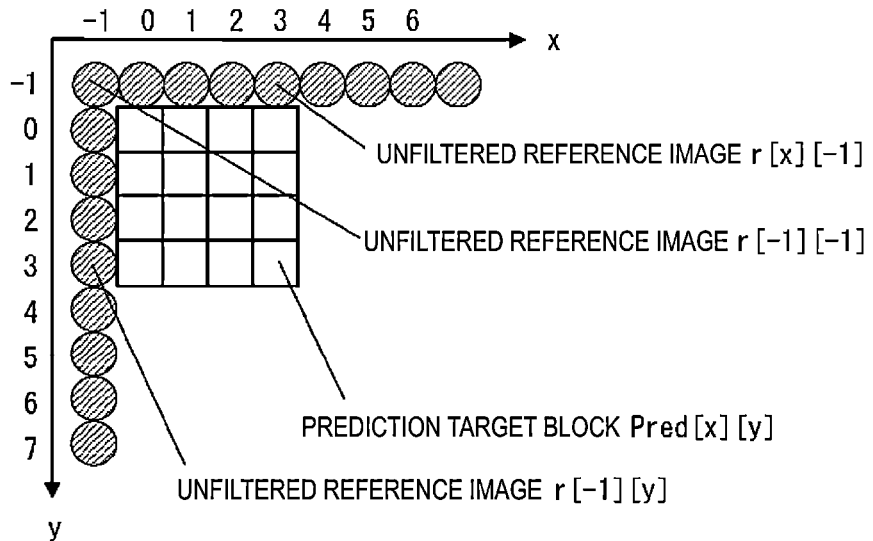
FIG. 9 is a diagram illustrating a reference region used for an intra prediction.
Figure 9:
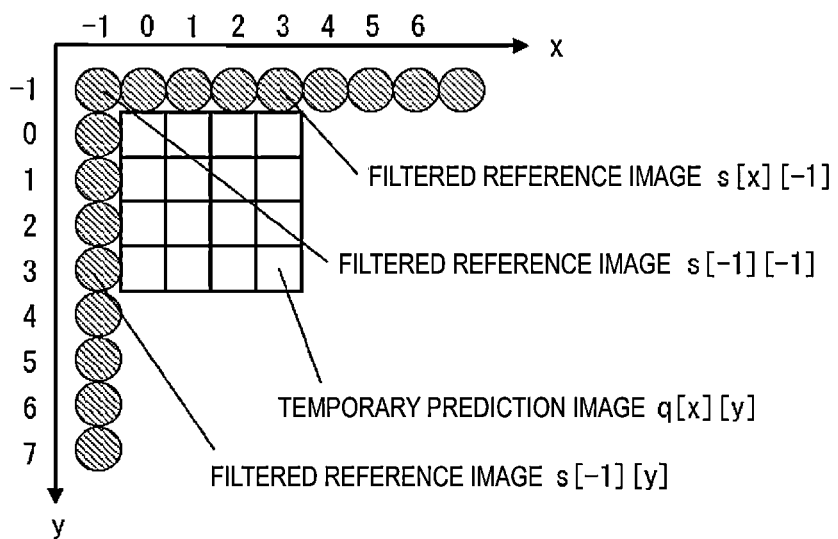

The unfiltered reference image configuration unit 3102 configures a neighboring peripheral region of the prediction target block as the reference region R based on the size and position of the prediction target block. Subsequently, each pixel value in the reference region R (unfiltered reference image, boundary pixel) is set equal to each decoded pixel value at the corresponding position on the reference picture memory 306. A decoded pixel row r[x][−1] adjacent to the upper side of the prediction target block and a decoded pixel column r[−1][y] adjacent to the left side of the prediction target block illustrated in FIG. 9(a) are unfiltered reference images.

Filtered Reference Image Configuration Unit 3103

The filtered reference image configuration unit 3103 applies the reference pixel filter (first filter) to the unfiltered reference image to derive a filtered reference image s[x][y] at each position (x, y) on the reference region R, in accordance with the intra prediction mode. Specifically, a low pass filter is applied to the unfiltered reference image at the position (x, y) and its surroundings, and a filtered reference image (FIG. 9(b)) is derived. Note that the low pass filter need not necessarily be applied to all the intra prediction modes, and the low pass filter may be applied to some intra prediction modes. Note that the filter applied to the unfiltered reference image on the reference region R in the filtered reference pixel configuration unit 3103 is referred to as the "reference pixel filter (first filter)", whereas a filter that corrects the temporary prediction image in the prediction image corrector 3105 described below is referred to as a "boundary filter (second filter)".

Configuration of Intra Predictor 3104

The intra predictor 3104 generates, based on the intra prediction mode, the unfiltered reference image, and the filtered reference pixel value, a temporary prediction image (temporary prediction pixel value, uncorrected prediction image) of the prediction target block, and outputs the generated image to the prediction image corrector 3105. The predictor 3104 includes a Planar prediction unit 31041, a DC prediction unit 31042, an Angular prediction unit 31043, and a CCLM prediction unit (prediction image generation apparatus) 31044 in the inside thereof. The predictor 3104 selects a specific predictor in accordance with the intra prediction mode, and inputs an unfiltered reference image and a filtered reference image thereto. The relationship between the intra prediction mode and the corresponding predictor is as follows.

Planar prediction . . . Planar prediction unit 31041
DC prediction . . . DC prediction unit 31042
Angular prediction . . . Angular prediction unit 31043
CCLM prediction . . . CCLM prediction unit 31044

Planar Prediction

The Planar prediction unit 31041 generates a temporary prediction image by linearly adding multiple filtered reference images in accordance with the distance between the prediction target pixel position and the reference pixel position, and outputs the generated image to the prediction image corrector 3105.

DC Prediction

The DC prediction unit 31042 derives a DC prediction value corresponding to the average value of the filtered reference image s[x][y], and outputs a temporary prediction image q[x][y], which takes the DC prediction value as a pixel value.

Angular Prediction

The Angular prediction unit 31043 generates the temporary prediction image q[x][y] using the filtered reference image s[x][y] in a prediction direction (reference direction) indicated by the intra prediction mode, and outputs the generated image to the prediction image corrector 3105.

Cross-Component Linear Model (CCLM) Prediction

The CCLM prediction unit 31044 predicts a chroma pixel value based on a luma pixel value. Specifically, the method uses a linear model to generate a prediction image of a chroma image (Cb, Cr) based on a decoded luma image.

Configuration of Prediction Image Corrector 3105

The prediction image corrector 3105 corrects the temporary prediction image output from the predictor 3104 in accordance with the intra prediction mode. Specifically, the prediction image corrector 3105 derives, by performing weighted addition (weighted-averaging) on the unfiltered reference image and the temporary prediction image for each pixel of the temporary prediction image, in accordance with the distance between the reference region R and the target prediction pixel, the prediction image (corrected prediction image) Pred in which the temporary prediction image is modified. Note that in some intra prediction modes (for example, Planar prediction, DC prediction, or the like), the prediction image corrector 3105 may not correct the temporary prediction image, and the output of the predictor 3104 may be used as the prediction image as it is.

The inverse quantization and inverse transform processing unit 311 performs inverse quantization on a quantization transform coefficient input from the entropy decoding unit 301 to calculate a transform coefficient. This quantization transform coefficient is a coefficient obtained by performing a frequency transform such as a Discrete Cosine Transform (DCT), a Discrete Sine Transform (DST), or the like on prediction errors to quantize in coding processing. The inverse quantization and inverse transform processing unit 311 performs an inverse frequency transform such as an inverse DCT, an inverse DST, or the like on the calculated transform coefficient to calculate a prediction error. The inverse quantization and inverse transform processing unit 311 outputs the prediction error to the addition unit 312.

The addition unit 312 adds the prediction image of the block input from the prediction image generation unit 308 and the prediction error input from the inverse quantization and inverse transform processing unit 311 for each pixel and generates a decoded image of the block. The addition unit 312 stores the decoded image of the block in the reference picture memory 306 and outputs the image to the loop filter 305.

Configuration of Video Coding Apparatus

Figure 14:
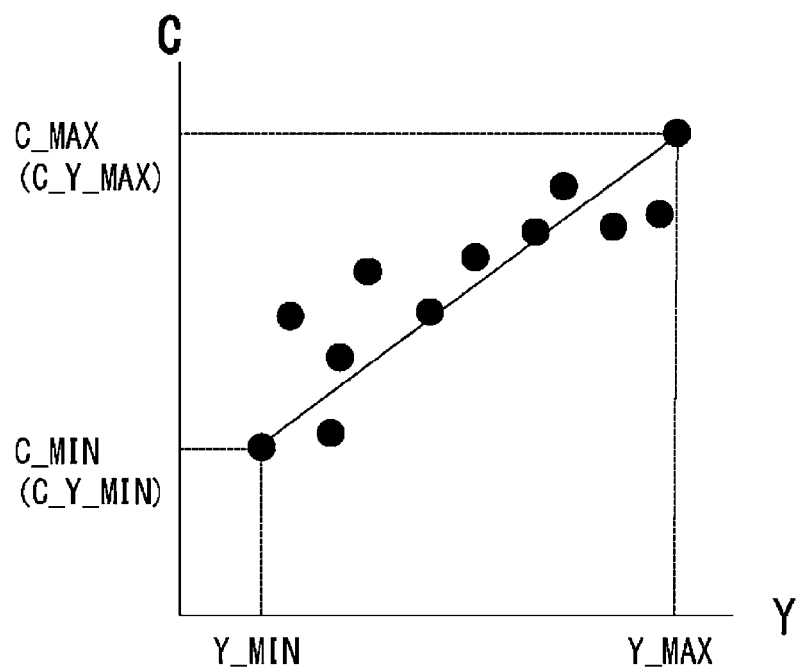
FIG. 14 is a diagram illustrating an example of a combination of (luma and chroma) used in a CCLM prediction according to the present embodiment.

Next, a configuration of the video coding apparatus 11 according to the present embodiment will be described. FIG. 14 is a block diagram illustrating a configuration of the video coding apparatus 11 according to the present embodiment. The video coding apparatus 11 is configured to include a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coding unit 111, and an entropy coding unit 104.

The prediction image generation unit 101 generates a prediction image for each CU that is a region obtained by splitting each picture of the image T. The operation of the prediction image generation unit 101 is the same as that of the prediction image generation unit 308 already described, and thus descriptions thereof will be omitted.

The subtraction unit 102 subtracts a pixel value of the prediction image of the block input from the prediction image generation unit 101 from a pixel value of the image T to generate a prediction error. The subtraction unit 102 outputs the prediction error to the transform and quantization unit 103.

The transform and quantization unit 103 calculates a transform coefficient by performing a frequency transform on the prediction error input from the subtraction unit 102, and derives a quantization transform coefficient by quantization. The transform and quantization unit 103 outputs the quantization transform coefficient to the entropy coding unit 104 and the inverse quantization and inverse transform processing unit 105.

The inverse quantization and inverse transform processing unit 105 is the same as the inverse quantization and inverse transform processing unit 311 (FIG. 7) in the video decoding apparatus 31, and descriptions thereof are omitted. The calculated prediction error is output to the addition unit 106.

To the entropy coding unit 104, the quantization transform coefficient is input from the transform and quantization unit 103, and coding parameters are input from the parameter coding unit 111. For example, coding parameters include codes such as a reference picture index refIdxLX, a prediction vector index mvp_LX_idx, a difference vector mvdLX, a motion vector precision mode amvr_mode, a prediction mode predMode, and a merge index merge_idx.

The entropy coding unit 104 performs entropy coding on split information, the prediction parameters, the quantization transform coefficient, and the like to generate and output the coding stream Te.

The parameter coding unit 111 includes a header coding unit 1110, a CT information coding unit 1111, a CU coding unit 1112 (prediction mode coding unit), and an inter prediction parameter coding unit 112 and an intra prediction parameter coding unit 113, which are not illustrated. The CU coding unit 1112 further includes a TU coding unit 1114.

Configuration of Intra Prediction Parameter Coding Unit 113

The intra prediction parameter coding unit 113 derives a format for coding (for example, mpm_idx, mpm_remainder, and the like) from the intra prediction mode IntraPredMode input from the coding parameter determination unit 110. The intra prediction parameter coding unit 113 includes a partly identical configuration to a configuration in which the intra prediction parameter decoding unit 304 derives intra prediction parameters.

Figure 15:
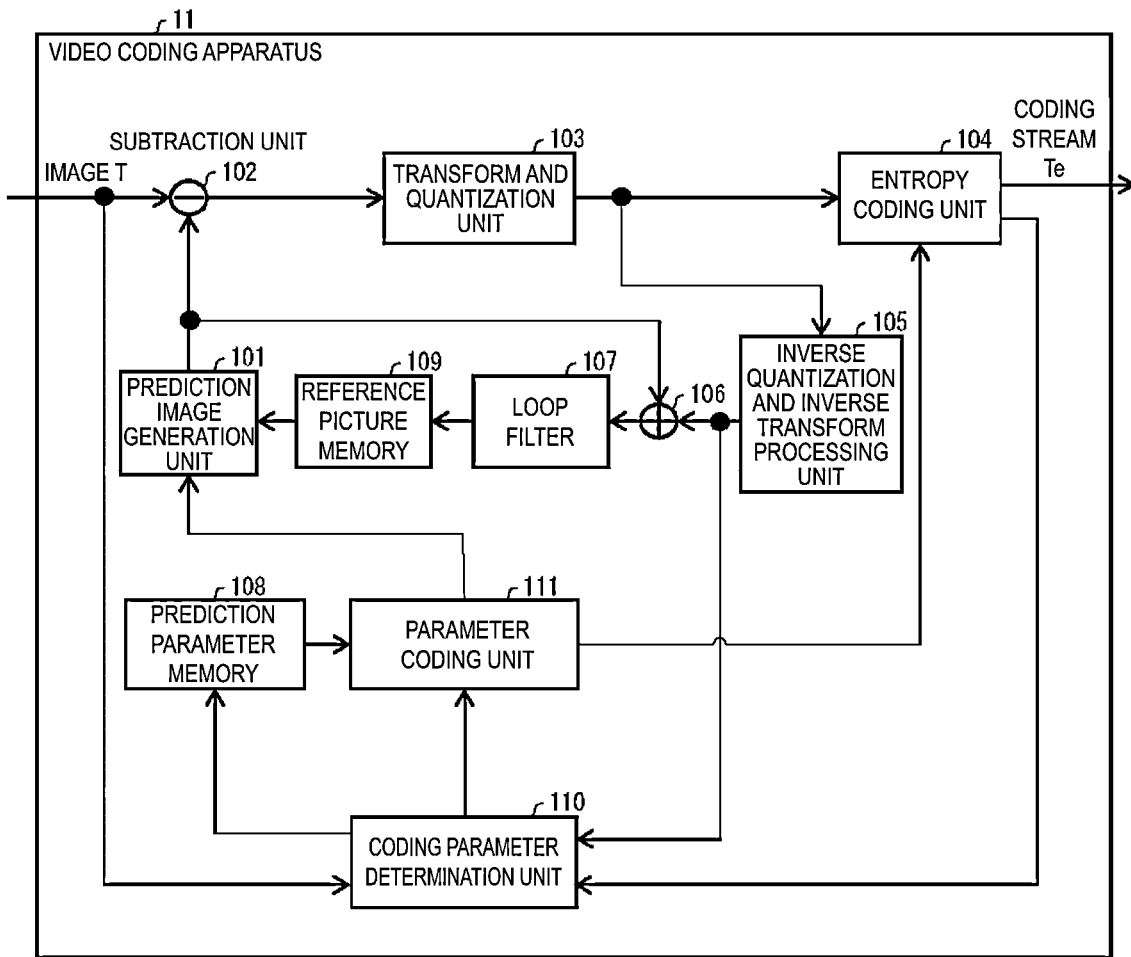
FIG. 15 is a block diagram illustrating a configuration of the video coding apparatus.
Figure 16:
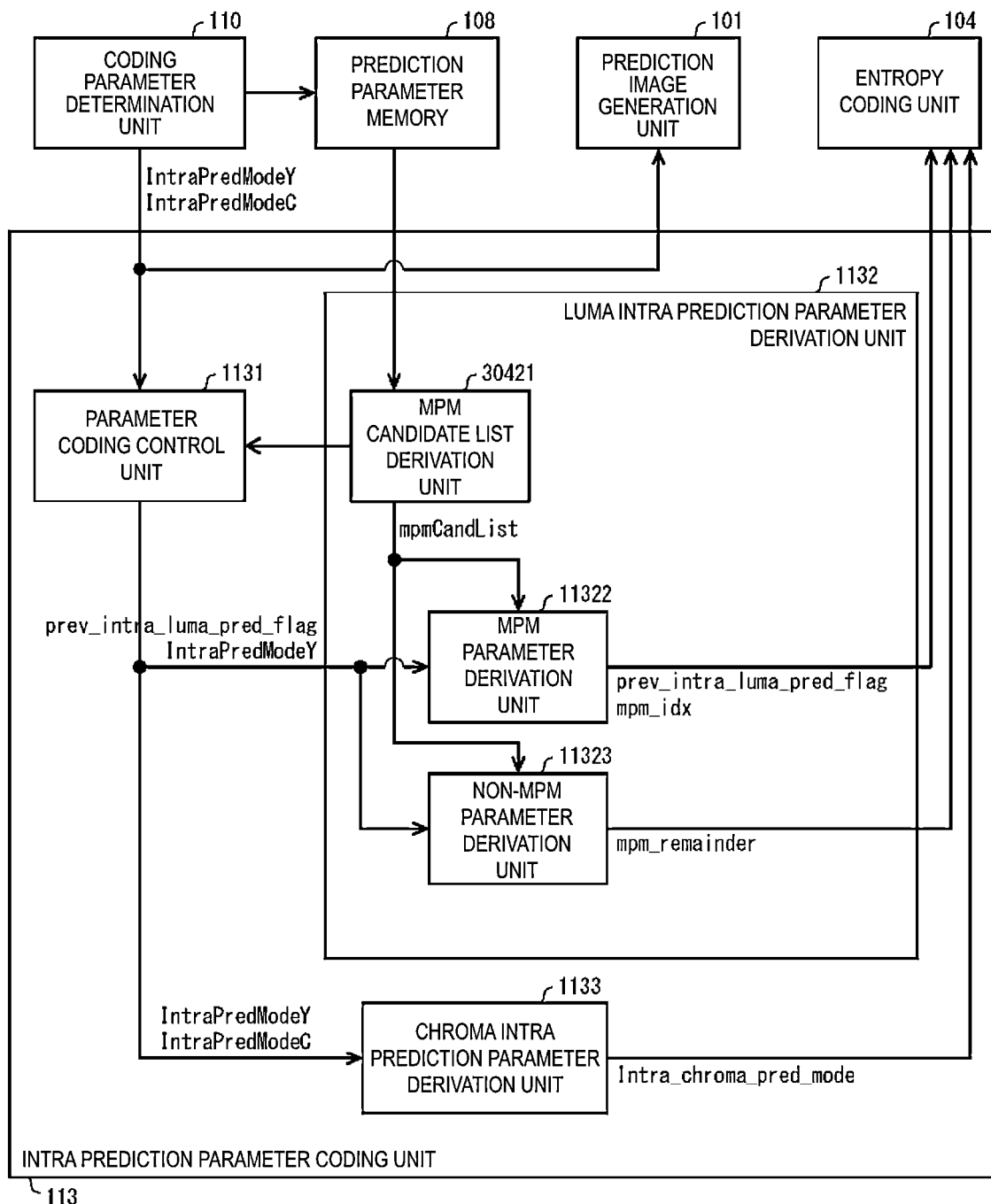
FIG. 16 is a schematic diagram illustrating a configuration of an intra prediction parameter coding unit.

FIG. 15 is a schematic diagram illustrating a configuration of the intra prediction parameter coding unit 113 of the parameter coding unit 111. The intra prediction parameter coding unit 113 is configured to include a parameter coding control unit 1131, a luma intra prediction parameter derivation unit 1132, and a chroma intra prediction parameter derivation unit 1133.

The parameter coding control unit 1131 receives input of the luma prediction mode IntraPredModeY and the chroma prediction mode IntraPredModeC from the coding parameter determination unit 110. The parameter coding control unit 1131 determines intra_luma_mpm_flag with reference to the MPM candidate list mpmCandList[ ] of the reference candidate list derivation unit 30421. Then, intra_luma_mpm_flag and IntraPredModeY are output to the luma intra prediction parameter derivation unit 1132. Furthermore, IntraPredModeC is output to the chroma intra prediction parameter derivation unit 1133.

The luma intra prediction parameter derivation unit 1132 is configured to include the MPM candidate list derivation unit 30421 (a candidate list derivation unit), an MPM parameter derivation unit 11322, and a non-MPM parameter derivation unit 11323 (a coder, a derivation unit).

The MPM candidate list derivation unit 30421 derives the MPM candidate list mpmCandList[ ], with reference to the intra prediction mode of the neighbouring block stored in the prediction parameter memory 108. The MPM parameter derivation unit 11322 derives mpm_idx from IntraPredModeY and mpmCandList[ ] in a case that intra_luma_mpm_flag is 1, and outputs the derivation result to the entropy coding unit 104. The non-MPM parameter derivation unit 11323 derives mpm_remainder from IntraPredModeY and mpmCandList[ ] in a case that intra_luma_mpm_flag is 0, and outputs the derivation result to the entropy coding unit 104.

The chroma intra prediction parameter derivation unit 1133 derives and outputs intra_chroma_pred_mode from IntraPredModeY and IntraPredModeC.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. A coding parameter refers to the above-mentioned QT, BT, or TT split information, the prediction parameter, or a parameter to be coded, the parameter being generated in association therewith. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient $\lambda$ by a square error. The coding parameter determination unit 110 selects a set of coding parameters of which cost value calculated is a minimum value. With this configuration, the entropy coding unit 104 outputs the selected set of coding parameters as the coding stream Te. The coding parameter determination unit 110 stores the determined coding parameters in the prediction parameter memory 108.

Note that, some of the video coding apparatus 11 and the video decoding apparatus 31 in the above-described embodiment, for example, the entropy decoding unit 301, the parameter decoding unit 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coding unit 104, the inverse quantization and inverse transform processing unit 105, the loop filter 107, the coding parameter determination unit 110, and the parameter coding unit 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present disclosure has been described in detail above referring to the drawings, but the specific configuration is not limited to the above embodiments and various amendments can be made to a design that fall within the scope that does not depart from the gist of the present disclosure.

APPLICATION EXAMPLES

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
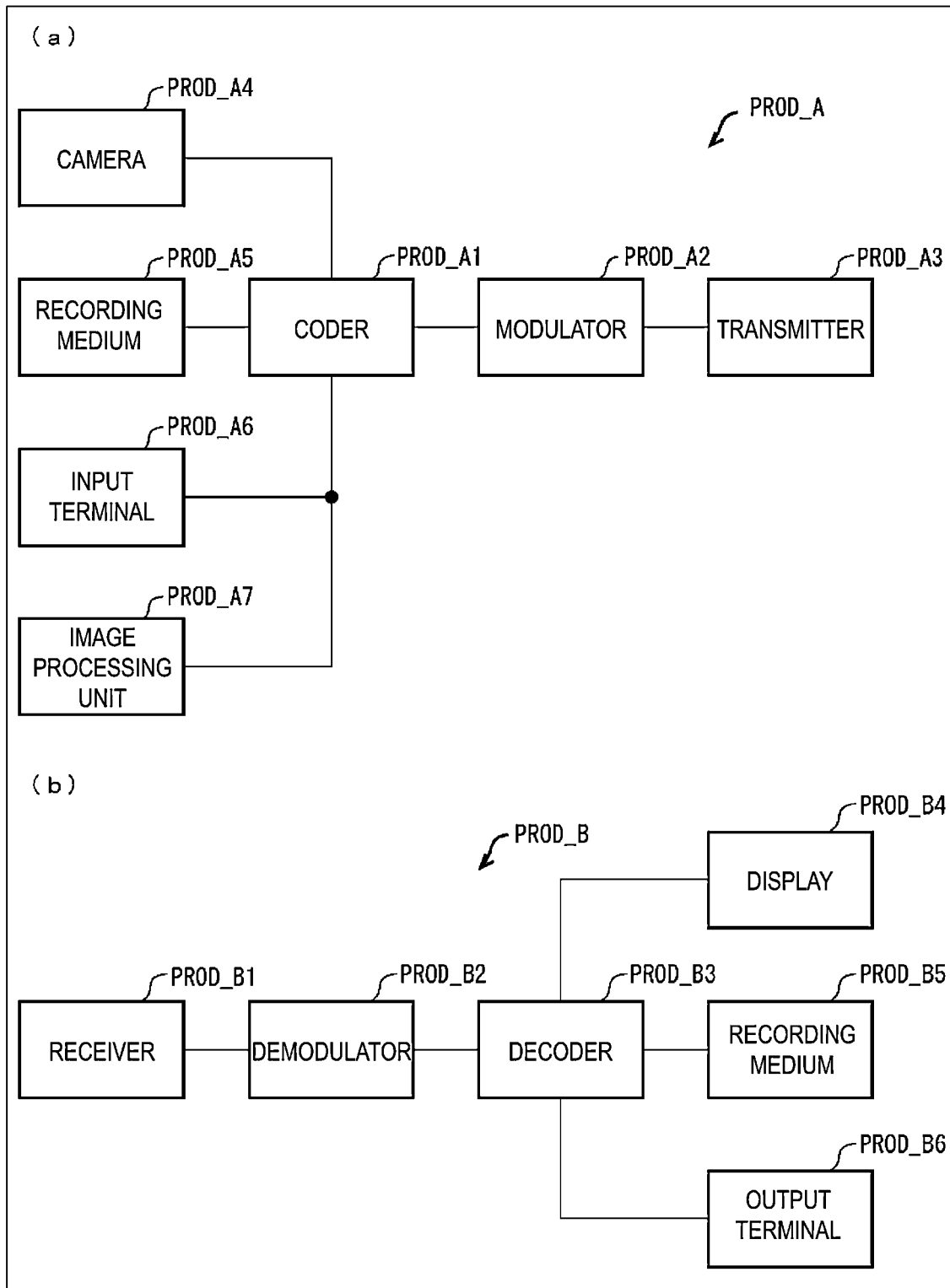
FIG. 2 is a diagram illustrating configurations of a transmitting apparatus equipped with a video coding apparatus and a receiving apparatus equipped with a video decoding apparatus according to the present embodiment. (a) thereof illustrates the transmitting apparatus equipped with the video coding apparatus, and (b) thereof illustrates the receiving apparatus equipped with the video decoding apparatus.

FIG. 2(*a*) is a block diagram illustrating a configuration of a transmitting apparatus PROD_A installed with the video coding apparatus 11. As illustrated in the diagram, the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(*b*) is a block diagram illustrating a configuration of a receiving apparatus PROD_B installed with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Figure 3:
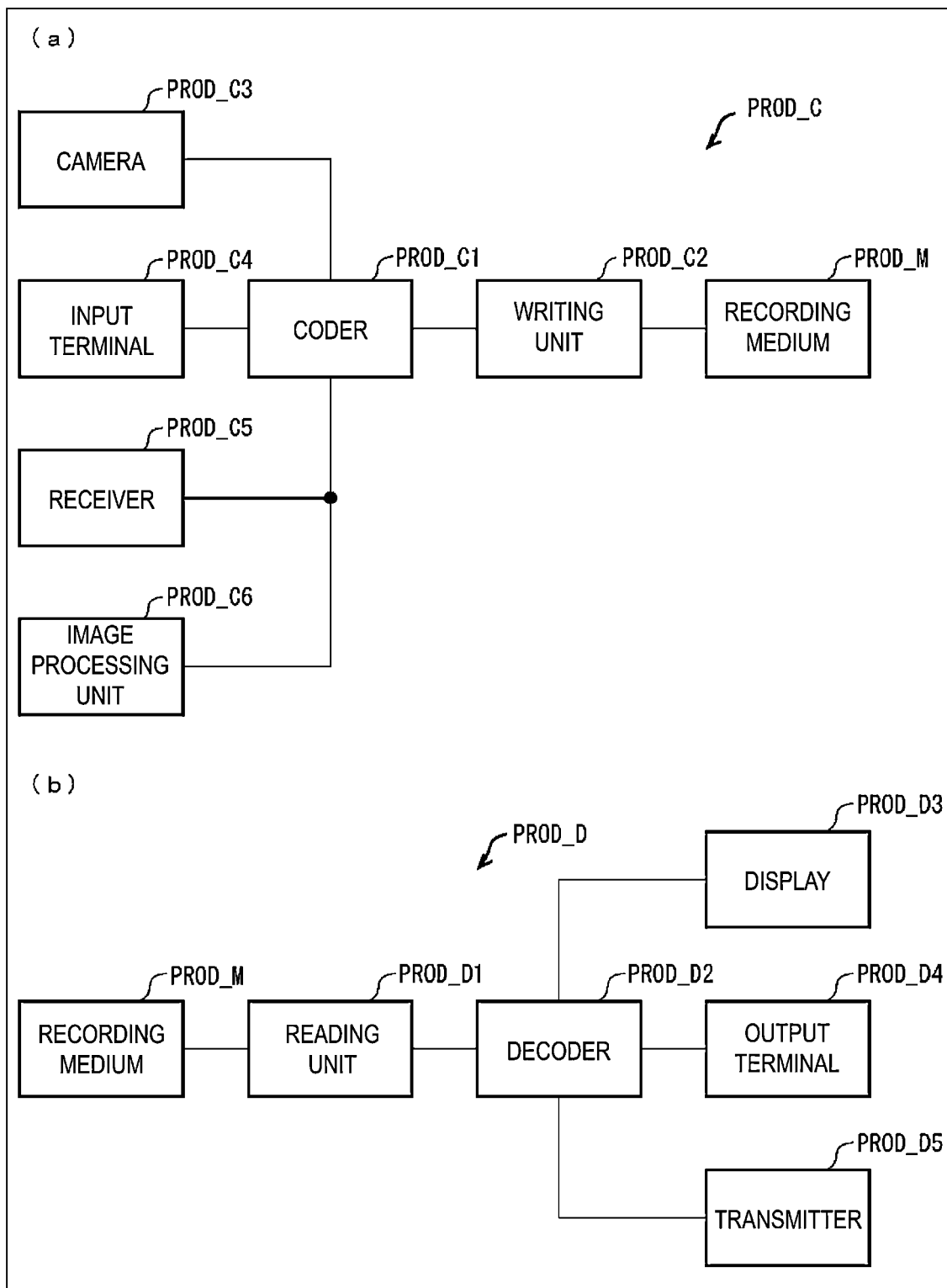
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

Next, referring to FIG. 3, it will be described that the above-mentioned video coding apparatus 11 and the video decoding apparatus 31 can be utilized for recording and regeneration of videos.

FIG. 3(a) is a block diagram illustrating a configuration of a recording apparatus PROD_C installed with the above-mentioned video coding apparatus 11. As illustrated in the diagram, the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3(b) is a block illustrating a configuration of a reconstruction apparatus PROD_D installed with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Chroma Intra Prediction Mode

Next, a CCLM prediction will be described with reference to FIGS. 11 to 14.

In derivation of the chroma prediction mode IntraPredModeC described above, the intra prediction parameter decoding unit 304 refers to the luma prediction mode IntraPredModeY, intra_chroma_pred_mode, and the table in FIG. 11(b). The diagram illustrates a derivation method of IntraPredModeC. In a case that intra_chroma_pred_mode is 0 to 3 and 7, IntraPredModeC is derived depending on the value of IntraPredModeY. For example, in a case that intra_chroma_pred_mode is 0 and IntraPredModeY is 0, IntraPredModeC is 66. Furthermore, in a case that intra_chroma_pred_mode is 3 and IntraPredModeY is 50, IntraPredModeC is 1. Note that the values of IntraPredModeY and IntraPredModeC represent the intra prediction mode of FIG. 6. In a case that intra_chroma_pred_mode is 4 to 6, IntraPredModeC is derived without depending on the value of IntraPredModeY. intra_chroma_pred_mode=81 (INTRA_LT_CCLM), 82 (INTRA_L_CCLM), and 83 (INTRA_T_CCLM) are, respectively, a mode for generating a prediction image of a chroma image based on a luma image of the top and left neighbouring block, a mode for generating a prediction image of a chroma image based on a luma image of the left neighbouring block, and a mode for generating a prediction image of a chroma image based on a luma image of the top neighbouring block.

Hereinafter, the CCLM prediction will be described. In the diagram, a target block and a neighbouring block of a luma image are represented by pY[ ][ ] and pRefY[ ] [ ], respectively. The target block has a width bW and a height 0.

Figure 13:
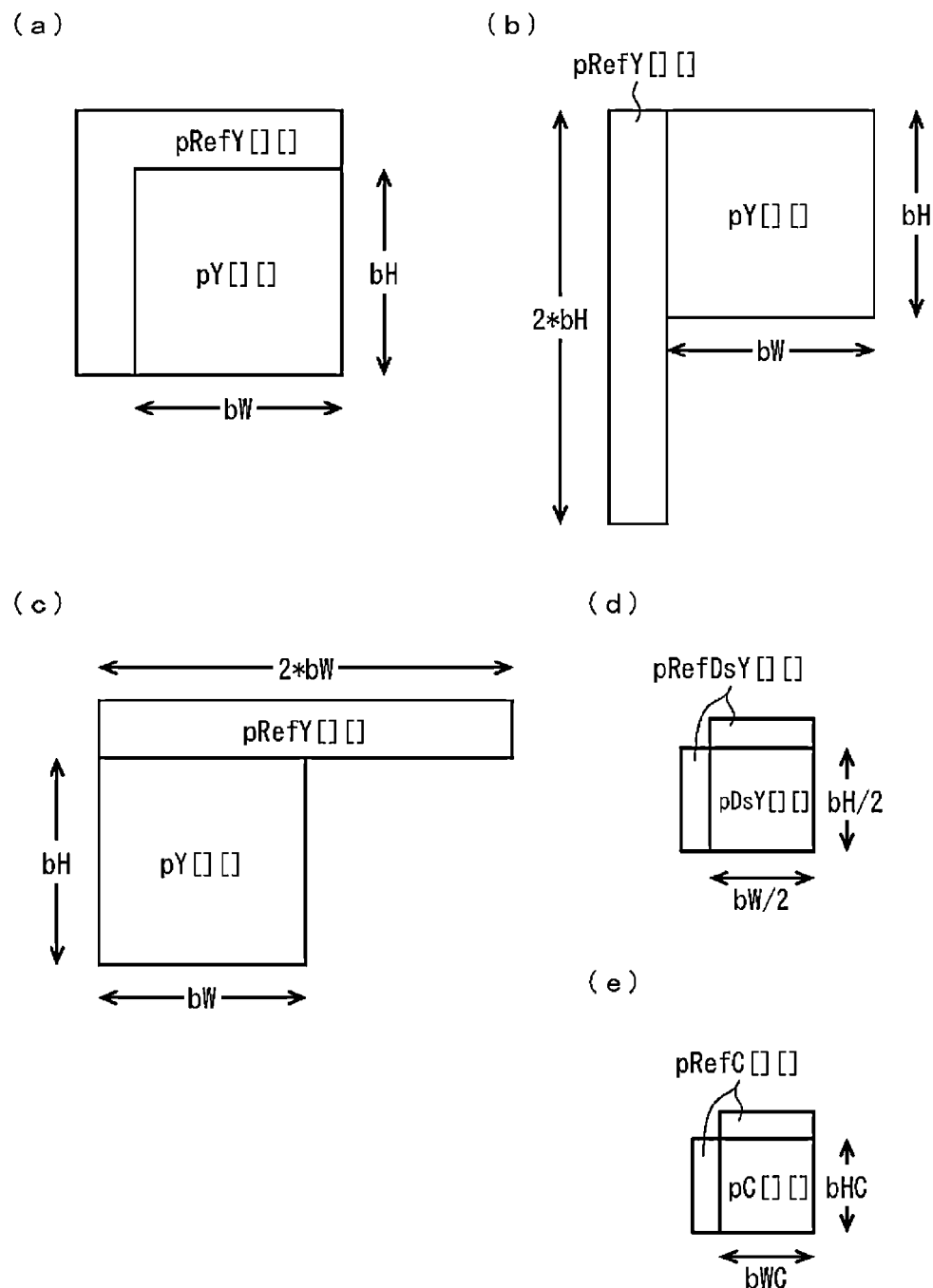
FIGS. 13(*a*) to (*e*) are diagrams each of which illustrates a pixel referred to at the time of derivation of a CCLM prediction parameter according to an embodiment of the present invention.

The CCLM prediction unit 31044 (unfiltered reference image configuration unit 3102) derives the CCLM prediction parameter by using the luma neighbouring image pRefY[ ][ ] in FIGS. 13(*a*) to (*c*) and the chroma neighbouring image pRefC[ ][ ] in FIG. 13(*e*) as a reference region. The CCLM prediction unit 31044 derives a prediction image of chroma using the luma target image pRef[ ].

The CCLM prediction unit 31044 derives the CCLM prediction parameter using the pixel value of the top and left neighbouring block of the target block as illustrated in (a) in a case that intra_chroma_pred_mode is 81 (INTRA_LT_C-CLM), derives the CCLM prediction parameter using the pixel value of the left neighbouring block as illustrated in (b) in a case that intra_chroma_pred_mode is 82 (INTRA_L_CCLM), and derives the CCLM prediction parameter using the pixel value of the top neighbouring block as illustrated in (c) in a case that intra_chroma_pred_mode is 83 (INTRA_T_CCLM). Each region may have the following sizes. In (a), the top side portion of the target block has a width bW and a height refH (refH>1), and the left side portion of the target block has a height bH and a width refW (refW>1). In (b), the height is 2*bH and the width is refW. In (c), the width is 2*bW and the height is refH. In order to perform downsampling processing, refW and refH may be configured to values greater than 1 in accordance with the number of taps of a downsampling filter. Furthermore, in (e), the target block and the neighbouring block of a chroma image (Cb, Cr) are represented by pC[ ][ ] and pRefC[ ][ ], respectively. The target block has a width bWC and a height bHC.

CCLM Prediction Unit

Figure 11:
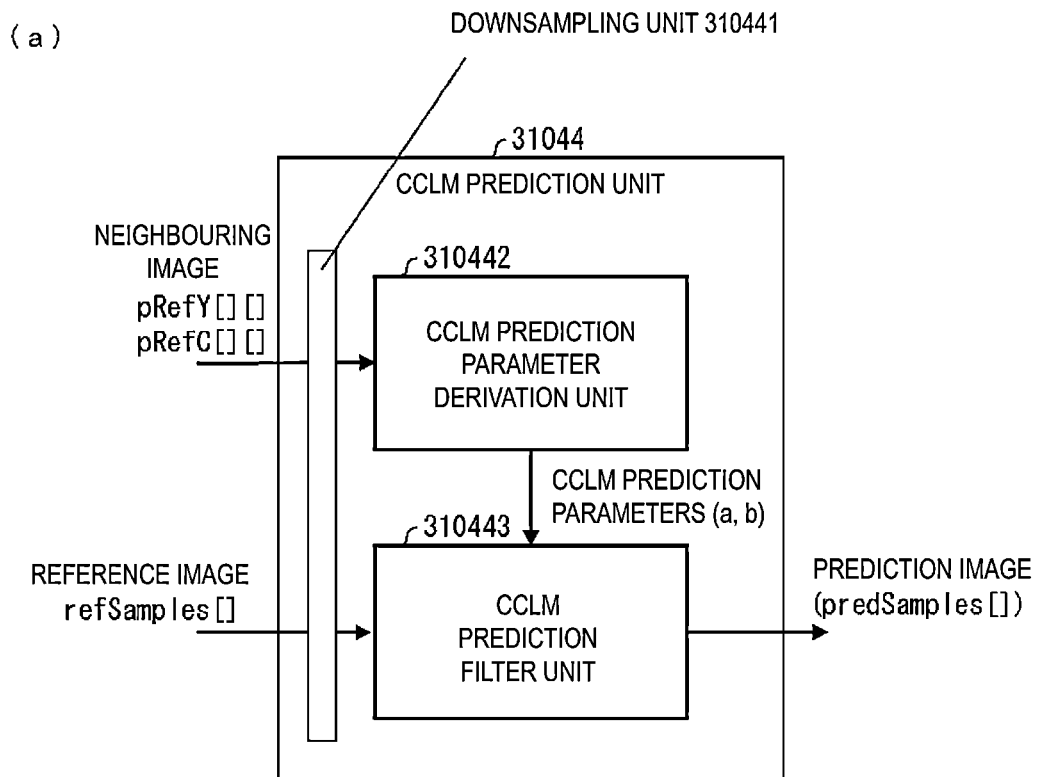
FIG. 11(*a*) is a block diagram illustrating an example of a configuration of a CCLM prediction unit according to an embodiment of the present invention, and (b) is a diagram illustrating a derivation method of IntraPredModeC.

The CCLM prediction unit 31044 will be described based on FIG. 11. FIG. 11 is a block diagram illustrating an example of a configuration of the CCLM prediction unit 31044. The CCLM prediction unit 31044 includes a downsampling unit 310441, a CCLM prediction parameter derivation unit (parameter derivation unit) 310442, and a CCLM prediction filter unit 310443.

The downsampling unit 310441 downsamples pRefY[ ][ ] and pY[ ][ ] for matching with the size of the chroma image. In a case that a chroma format is 4:2:0, the numbers of pixels in the horizontal and vertical directions of pRefY[ ][ ] and pY[ ][ ] are sampled at 2:1, and the results are stored in pRefDsY[ ][ ] and pDsY[ ][ ] in FIG. 13(*d*). Note that bW/2 and bH/2 are equal to bWC and bHC, respectively. In a case that the chroma format is 4:2:2, the numbers of pixels in the horizontal direction of pRefY[ ][ ] and pY[ ][ ] are sampled at 2:1, and the results are stored in pRefDsY[ ][ ] and pDsY[ ][ ]. In a case that the chroma format is 4:4:4, the sampling is not performed, and pRefY[ ][ ] and pY[ ][ ] are stored in pRefDsY[ ][ ] and pDsY[ ][ ]. An example of sampling is illustrated by the following equations.

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3$$

$$pRefDsY[x][y]=(pRefY[2*x-1][2*y]+pRefY[2*x-1][2*y+1]+2*pRefY[2*x][2*y]+2*pRefY[2*x][2*y+1]+pRefY[2*x+1][2*y]+pRefY[2*x+1][2*y+1]+4)>>3$$

The CCLM prediction filter unit 310443 takes a reference image refSamples[ ][ ] as an input signal, and outputs a prediction image predSamples[ ][ ] using the CCLM prediction parameters (a, b).

$$predSamples[\ ][\ ]=((a*refSamples[\ ][\ ])>>shiftA)+b \quad (\text{CCLM-1})$$

Here, refSamples is pDsY in FIG. 13(*d*), (a, b) are the CCLM prediction parameters derived by the CCLM prediction parameter derivation unit 310442, and predSamples[ ][ ] is the chroma prediction image (pC in FIG. 13(*e*)). Note that (a, b) are derived for Cb and Cr, respectively. In addition, shiftA is a normalized number of shifts indicating the precision of the a value, and a=af<<shiftA is obtained in a case that the gradient of fractional precision is taken as af. For example, shiftA=16.

Figure 12:
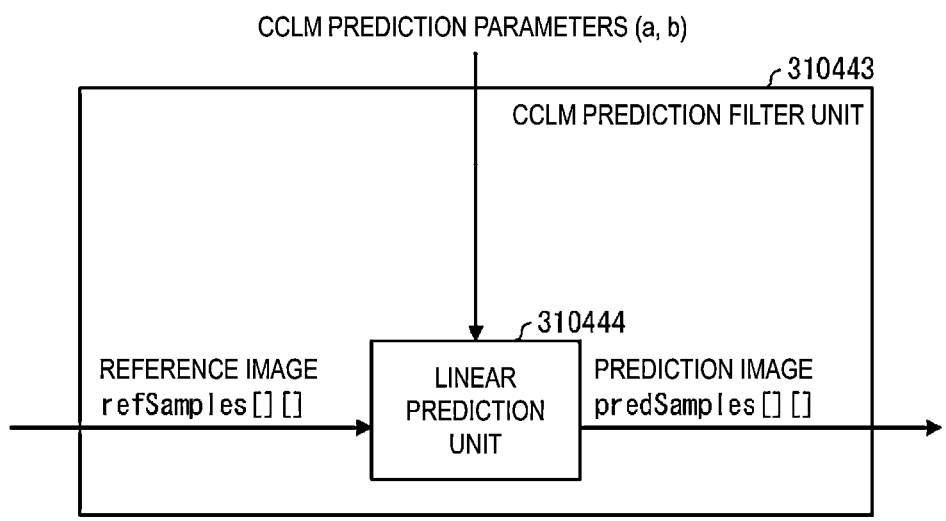
FIG. 12 is a block diagram illustrating a configuration example of a CCLM prediction filter unit according to an embodiment of the present invention.

FIG. 12 illustrates a configuration of the CCLM prediction filter unit 310443 that predicts the chroma from the luma. As illustrated in FIG. 12, the CCLM prediction filter unit 310443 includes a linear prediction unit 310444. The linear prediction unit 310444 takes refSamples[ ][ ] as an input signal, and outputs predSamples[ ][ ] using the CCLM prediction parameters (a, b).

More specifically, the linear prediction unit 310444 derives a chroma Cb or Cr from a luma Y by the following equation using the CCLM prediction parameters (a, b), and outputs predSamples[ ][ ] using this.

$$Cb(\text{or } Cr)=aY+b$$

The CCLM prediction parameter derivation unit 310442 derives the CCLM prediction parameter using a downsampled neighbouring block pRefY (pRefDsY[ ][ ] in FIG. 13(*d*)) of luma and a neighbouring block pRefC[ ][ ] (pRefC[ ][ ] in FIG. 13(*e*)) of chroma, as input signals. The CCLM prediction parameter derivation unit 310442 outputs the derived CCLM prediction parameters (a, b) to the CCLM prediction filter unit 310443.

CCLM Prediction Parameter Derivation Unit

The CCLM prediction parameter derivation unit 310442 derives the CCLM prediction parameters (a, b) in a case that the prediction block predSamples[ ][ ] of the target block is linearly predicted from the reference block refSamples[ ][ ].

In the derivation of the CCLM prediction parameters (a, b), the CCLM prediction parameter derivation unit 310442 derives, from the set of neighbouring block (luma value Y, chroma value C), a point (x1, y1) where the luma value Y is maximized (Y_MAX) and a point (x2, y2) where it is minimized (Y_MIN). Next, pixel values of (x1, y1) and (x2, y2) on pRefC corresponding to (x1, y1) and (x2, y2) on pRefDsY are taken, respectively, as C_MAX (or C_Y_MAX) and C_MIN (or C_Y_MIN). Then, as illustrated in FIG. 14, a straight line connecting (Y_MAX, C_MAX) and (Y_MIN, C_MIN) is obtained on the graph in which Y and C are taken on the x and y axes, respectively. The CCLM prediction parameters (a, b) of this straight line can be derived by the following equations.

$$a=(C\_MAX-C\_MIN)/(Y\_MAX-Y\_MIN)$$

$$b=C\_MIN-(a*Y\_MIN)$$

In a case of using this (a, b), shiftA=0 is established in the equation (CCLM-1).

Here, in a case that the chroma is Cb, (C_MAX, C_MIN) are the pixel values of (x1, y1), (x2, y2) of the neighbouring block pRefCb[ ][ ] of Cb, and in a case that the chroma is Cr, (C_MAX, C_MIN) are the pixel values of (x1, y1), (x2, y2) of the neighbouring block pRefCr[ ][ ] of Cr.

Note that since the division is high in calculation cost, the CCLM prediction parameters (a, b) are derived by an integer operation and a table reference instead of the division. Specifically, the parameters are obtained by the following equations. Note that in the embodiments described below, a table (a table which takes d=diff−1 as an argument) excluding a case of d=0 is used in an inverse number table required for division of 1/d, but as a matter of course, a table which takes d=diff as an argument may be used.

ChromaDelta=$C\_MAX-C\_MIN$ low=(ChrmaDelta*LMDivTableLow[diff−1]+ $2^{\wedge}15$)>>16

$a$=(ChromaDelta*LMDivTable[diff−1]+low+ add)>>shift$B$ $b$=$C\_MIN-((a*Y\_MIN)$>>shift$A$)

diff=($Y\_MAX-Y\_MIN$+add)>>shift$B$ shift$B$=(BitDepth$C$>8)?(BitDepth$C$−9):0 add=(shift$B$>0)?1<<(shift$B$−1):0

Note that in a case of diff=0, setting of a=0 is performed. Here, LMDivTableLow[ ] and LMDivTable[ ] are tables (inverse number, inverse number table) for performing division with table reference, and are derived beforehand by the following equations. In other words, the value stored in the table is the derivation value (the value corresponding to the inverse number of the divisor). That is, in the table, the difference value and the derivation value are stored in association with each other. Furthermore, shiftB is a shift value used to quantize the value range of diff, which is different in accordance with bit depth, so as to be smaller than or equal to $2^{\wedge}9=512$. Note that in a case that the bit depth BitDepthC of the chroma image is equal to or greater than 10 bits, quantization is performed beforehand such that diff falls within the range of 0 to 512. shiftB is not limited to the above. For example, by using a prescribed constant Q (e.g., 2, 6, or the like), the following may be performed. The same applies to other working examples.

shift$B$=BitDepth$C-Q$

LMDivTable[diff−1]=floor($2^{\wedge}16$/diff)

LMDivTableLow[diff−1]=floor(($2^{\wedge}16*2^{\wedge}16$)/diff)− floor($2^{\wedge}16$/diff)*$2^{\wedge}16$ LMDivTable[diff−1] represents the integer part of (1/diff*$2^{\wedge}16$).

LMDivTableLow[diff−1] represents $2^{\wedge}16$ times the fractional part of (1/diff*$2^{\wedge}16$).

Additionally, a and b become $2^{\wedge}16$ times (16th power of 2) the value of the above-described equation (C=a*Y+b).

For example, in a case of diff=7, the following equations are obtained.

LMDivTable[7−1]=floor($2^{\wedge}16$/7)=9362

LMDivTableLow[7−1]=floor(($2^{\wedge}16*2^{\wedge}16$)/7)−floor ($2^{\wedge}16$/7)*$2^{\wedge}16$=18724

In a case of using (a, b) derived in the above, shiftA of the equation (CCLM-1) is 16.

Specific Processing in CCLM Prediction Unit

Processing Example 1

In the above-described embodiment, in order to derive the CCLM prediction parameter, the CCLM prediction parameter derivation unit 310442 has used a table LMDivTable representing the integer part of 1/diff and a table LMDivTableLow representing the fractional part of 1/diff. Here, the maximum value of the table LMDivTable is 65536 (17 bits), and the maximum value of the table LMDivTableLow is 65140 (16 bits). Since the number of elements of each table is 512 elements, in order to store the table LMDivTable and the table LMDivTableLow, a very large memory size of 17*512+16*512=16896 (bits) is required.

In the present processing example, the CCLM prediction parameter derivation unit 310442 derives the CCLM prediction parameter without using the table LMDivTableLow, which represents the fractional part of 1/diff, of the two tables. That is, the CCLM prediction parameter derivation unit 310442 derives the CCLM prediction parameters (a, b) by the following equations.

$a$=(ChromaDelta*LMDivTable[diff−1]+add)>>shift$B$ $b=C\_MIN-((a*Y\_MIN)$>>shift$A$)

add=(shift$B$>0)?1<<(shift$B$−1):0

The inventors have experimentally confirmed that even only one table LMDivTable has sufficient performance for CCLM prediction.

With this configuration, it is not necessary to store the table LMDivTableLow, and thus the amount of memory required to store the table can be approximately halved. Moreover, since an operation for deriving div is not required, the processing load can also be reduced.

As described above, the CCLM prediction unit 31044 according to the present processing is a unit configured to generate a prediction image by the CCLM prediction, and include the CCLM prediction parameter derivation unit 310442 configured to derive, by using the table LMDivTable in which multiple luma reference pixel difference values and derivation values configured to derive the CCLM prediction parameter from the difference values are associated, the CCLM prediction parameter. The table LMDivTable stores an integer part of a value obtained by multiplying the inverse number of the difference value by a prescribed number.

This makes it possible to reduce the amount of memory of the table required for deriving the CCLM prediction parameter.

Processing Example 2

In the present processing example, the number of bits (bit width) of the table LMDivTable used by the CCLM prediction parameter derivation unit 310442 is reduced.

In the above-described embodiment, the values in the table LMDivTable are integer parts of (1/diff)*65536, and thus are as follows.

65536, 32768, 21845, 16384, 13107, 10922, 9362, 8192, 7281, 6553, 5957, 5461, 5041, 4681, 4369, 4096, 3855, 3640, 3449, 3276, 3120, 2978, 2849, 2730, 2621, 2520, 2427, 2340, 2259, 2184, 2114, 2048, . . . .

In the present processing example, the significand (mantissa, m) of each of the values described above is approximated by an exponential expression (m*$2^{\wedge}$exp) expressed in P bits, and only the significand is stored in a table DivTableM. For example, in a case of P=5, the values of the inverse number table are as follows.

16*$2^{\wedge}12$, 16*$2^{\wedge}11$, 21*$2^{\wedge}10$, 16*$2^{\wedge}10$, 26*$2^{\wedge}9$, 21*$2^{\wedge}9$, 18*$2^{\wedge}9$, 16*$2^{\wedge}9$, 28*$2^{\wedge}8$, 26*$2^{\wedge}8$, 23*$2^{\wedge}8$, 21*$2^{\wedge}8$, 20*$2^{\wedge}8$, 18*$2^{\wedge}8$, 17*$2^{\wedge}8$, 16*$2^{\wedge}8$, 30*$2^{\wedge}7$, 28*$2^{\wedge}7$, 27*$2^{\wedge}7$, 26*$2^{\wedge}7$, 24*$2^{\wedge}7$, 23*$2^{\wedge}7$, 22*$2^{\wedge}7$, 21*$2^{\wedge}7$, 20*$2^{\wedge}7$, 20*$2^{\wedge}7$, 19*$2^{\wedge}7$, 18*$2^{\wedge}7$, 18*$2^{\wedge}7$, 17*$2^{\wedge}7$, 17*$2^{\wedge}7$, 16*$2^{\wedge}7$, . . . .

In the table DivTableM, only the significands of these values are stored. that is, DivTableM[ ]={16, 16, 21, 16, 26, 21, 18, 16, 28, 26, 23, 21, 20, 18, 17, 16, 30, 28, 27, 26, 24, 23, 22, 21, 20, 20, 19, 18, 18, 17, 17, 16, ... }

With this, each of the values that has required a maximum of 17 bits in the above embodiment can be expressed by 5 bits, and the amount of memory required to store the table DivTableM can be reduced.

Note that in a case that $2^N$ pieces from the first of the table are to be stored, a value obtained by subtracting $2^{(P-1)}$ from each value is stored in the table DivTableM, and the above-described value may be derived by adding $2^{(P-1)}$ to the value obtained from this table since the minimum value of the table DivTableM is $2^{(P-1)}$. In this case, the required memory can be further reduced by 1 bit for each value. Hereinafter, in the case that $2^N$ pieces from the first of the table DivTableM are to be stored, the offset value of the table DivTableM is referred to as offsetM. In a case that a table from which the offset is subtracted is used, offsetM=$2^{(P-1)}$ is used. Otherwise, offsetM=0 is used.

In addition, in a case that an integer part of $(1/\text{diff})*(2^{16})$ is expressed by exponent and only the significand of the inverse number table is stored, it is necessary to derive the value of the exponent part. In the present processing example, the CCLM prediction parameter derivation unit 310442 derives the value of the exponent part in accordance with the following equation.

$$\exp=clz(d,N)+(16-N-(P-1))$$

Here d=diff−1 (luma difference), exp represents an exponent part, and N represents the number of elements stored as a table. For example, 512 elements are stored in a case of N=9, and 32 elements are stored in a case of N=5. Furthermore, "16" is the precision of 1/diff, that is, the number of bits of a multiplier for converting 1/diff into an integer expression. In the above-described embodiment, in order to derive the value of 1/diff with integer precision, the calculation has been performed by multiplying by 65536 (=$2^{16}$). Note that the precision of 1/diff is arbitrary, and in a case that another value is used, it is necessary to change "16" in accordance therewith.

A count leading zeros (clz) function is a function including two arguments (d, mw), and returns the number of zeros continuous from a most significant bit (MSB) of a first argument d represented in binary. The second argument mw represents the maximum number of digits (the number of bits). For example, in a case of P=5, clz(1, mw)=4 is established in a case of d=1 (0b00001, diff=2) (0b is a prefix that indicates a binary number), and clz(2, mw)=3 is established in a case of d=2 (0b00010, diff=3). In addition, clz(16, mw)=0 is established in a case of d=16 (0b10000, diff=17). Note that in a case that the first argument d is 0, the second argument mw is returned. That is, clz(0, mw)=mw is established in a case of d=0 (0b00000, diff=1).

Note that for the clz function, a dedicated instruction is installed in many CPUs. In a dedicated instruction, the maximum number of digits is limited to a value such as 8, 16, 32 in some cases, for example, in a case of mw<=8, clz(d, mw)=clz(d, 8)−(8−mw) is established. Furthermore, the dedicated instruction is not essential, for example, and in the case of clz(d, 4), may be substituted with the following equation.

$$clz(d,4)=(d\&0x08)?1:(d\&0x04)?2:(d\&0x02)?3:(d\&0x01)?4:5$$

The CCLM prediction unit 31044 derives the CCLM prediction parameter a by shifting the value obtained by multiplying DivTableM[d] referred to with the luma difference d (=diff−1) and a chroma difference ChromaDelta, by exp derived from d.

$$a=(\text{ChromaDelta}*\text{DivTableM}[d]<<\exp)+\text{add})>>\text{shift}B$$

$$b=C\_MIN-((a*Y\_MIN)>>\text{shift}A)$$

Here, $\exp=clz(d,N)+(16-N-(P-1))=16-(P-1)-(N-clz(d,N))$

LMDivTable[d] in Processing Example 1, DivTableM[d], and exp satisfy the following relationship.

$$\text{LMDivTable}[d]=\text{DivTableM}[d]<<\exp$$

Note that as described below, after deriving the number of shifts (shiftB−exp) using the exponent part exp, the CCLM prediction parameter a may be derived. Note that hereinafter, for simplification, in a case that shift values of a right bit shift operation and a left bit shift operation become negative, the sign of the shift value and the shift direction are assumed to be reversed. The same applies to other examples.

$$a=(\text{ChromaDelta}*\text{DivTableM}[d]+\text{add})>>(\text{shift}B-\exp)$$

Here, $$\text{add}=(\text{shift}B-\exp>0)?1<<(\text{shift}B-\exp-1):0$$

Alternatively, the CCLM prediction parameter derivation unit 310442 may derive the value of the exponent part in accordance with the following equation.

$$\exp=16-(P-1)-\text{ceil}(\log 2(\text{diff}))$$

In addition, only the exponent part may be stored as a table ShiftTableE. For example, in a case of P=5, as the table ShiftTableE[ ], ShiftTableE[ ]={12, 11, 10, 10, 9, 9, 9, 9, 8, 8, 8, 8, 8, 8, 8, 8, 7, 7, 7, 7, 7, 7, 7, 7, 7, 7, 7, 7, 7, 7, 7, 7, ... } is obtained. Alternatively, by using a table ShiftTableE'[ ] indicated below,

ShiftTableE'[ ]={0, 1, 2, 2, 3, 3, 3, 3, 4, 4, 4, 4, 4, 4, 4, 4, 5, 5, 5, 5, 5, 5, 5, 5, 5, 5, 5, 5, 5, 5, 5, 5, ... } the exponent part may be obtained as $$\exp=16-(P-1)-\text{ShiftTable}E'[d].$$

The table ShiftTableE and the table ShiftTableE' can be used in place of the clz function in a case that the maximum number of digits mw is equal to or smaller than N.

$$clz(d,mw)=mw-\text{ShiftTable}E'[d]=mw-(16-(P-1)-\text{ShiftTable}E[d]))$$

The CCLM prediction unit 31044 derives the CCLM parameters by using the table DivTableM and the shift table ShiftTableE as described below.

$$a=(\text{ChromaDelta}*\text{DivTableM}[d]<<\text{ShiftTable}E[d])+\text{add})>>\text{shift}B$$

$$b=C\_MIN-((a*Y\_MIN)>>\text{shift}A)$$

Note that as described below, after deriving the number of shifts (shiftB−exp) using the exponent part exp, the CCLM prediction parameter a may be derived.

$$a=(\text{ChromaDelta}*\text{DivTableM}[d]+\text{add})>>(\text{shift}B-\exp)$$

Here, $$\text{add}=(\text{shift}B-\exp>0)?1<<(\text{shift}B-\exp-1):0,$$

$$\exp=\text{ShiftTable}E[d]$$

As described above, the CCLM prediction unit 31044 according to the present processing example is a unit configured to generate a prediction image by the CCLM prediction, and includes the CCLM prediction parameter derivation unit 310442 configured to derive the CCLM prediction parameter a by the luma difference value (d), the chroma difference value (ChromaDelta), and the inverse number table DivTableM. The CCLM prediction parameter derivation unit 310442 derives the exponent part exp corresponding to the inverse number of the luma difference value (d), multiplies the element of the table DivTableM and the chroma difference value, and derives the CCLM prediction parameter by shifting by the number of shifts derived by the exponent part exp.

According to the configuration described above, it is possible to reduce the number of bits of the value stored in the inverse number table required for deriving the CCLM prediction parameter, and reduce the required amount of memory. Note that as described in Processing Example 1, although it is not necessary to use the table LMDivTableLow, also in a case that the table LMDivTableLow is stored, in the same manner, a table may be created in which each component of LMDivTableLow is divided into the significand and the exponent part.

Supplement to Bit Amount of Product

As described above, in the CCLM, in derivation of the CCLM prediction parameters a and b and generation of the prediction image using a and b, the products of ChromaDelta*LMDivTable[diff−1], a*Y_MIN, and a*refSamples[ ][ ] are required.

$a=(\text{ChromaDelta}*\text{LMDivTable}[\text{diff}-1]+\text{low}+\text{add})\!>\!>\!\text{shiftB}/\!/11\text{ bits}*17\text{ bits}=28$ $b=C\_MIN-((a*Y\_MIN)\!>\!>\!\text{shiftA})/\!/27\text{ bits}*10\text{ bits}=37$ $\text{predSamples}[\ ][\ ]=((a*\text{refSamples}[\ ][\ ])\!>\!>\!\text{shiftA})+b/\!/27\text{ bits}*10\text{ bits}=37$ Bit Width of Parameter a For example, in the above-described calculation to Processing Example 1, in the 10-bit image, the bit widths of ChromaDelta, a, Y_MIN, and refSamples[ ][ ] are 11 bits, 10 bits, 10 bits, and 10 bits, respectively, and the bit widths of LMDivTable[diff−1] and a in shiftA=16 are 16 bits and 27 bits (=11 bits*16 bits), respectively. As a result, the products in the derivation of a, the derivation of b, and the prediction using a are the products of large bit widths of 11 bits*17 bits, 27 bits*10 bits, and 27 bits*10 bits, respectively, this leads to a complicated hardware.

In Processing Example 2, the product of ChromaDelta*DivTableM[d] in the derivation of a is reduced to a bit width smaller by exp (=ShiftTableE[d]) than that in Processing Example 1, and thus an effect in which the product is simplified is obtained.

Processing Example 3

In the above-described embodiment, the table LMDivTable (and LMDivTableLow) required to perform the CCLM prediction stores values corresponding to 512 elements from 1 to 512 that is a range of values that the luma difference value diff can take. In the present processing example, by reducing the number of elements stored in the table, and deriving elements that is not stored by calculation, the required memory is reduced.

For example, the CCLM prediction parameter derivation unit 310442 derives the CCLM prediction parameters (a, b) by using a table LMDivTable_2N with $2^N$ elements. Then, the CCLM prediction parameter derivation unit 310442 calculates the value of an element which is not stored in the table LMDivTable_2N by multiplying the value stored therein by 1/k. LMDivTable_2N[ ] is a table that stores the first $2^N$ elements of LMDivTable[ ].

Figure 17:
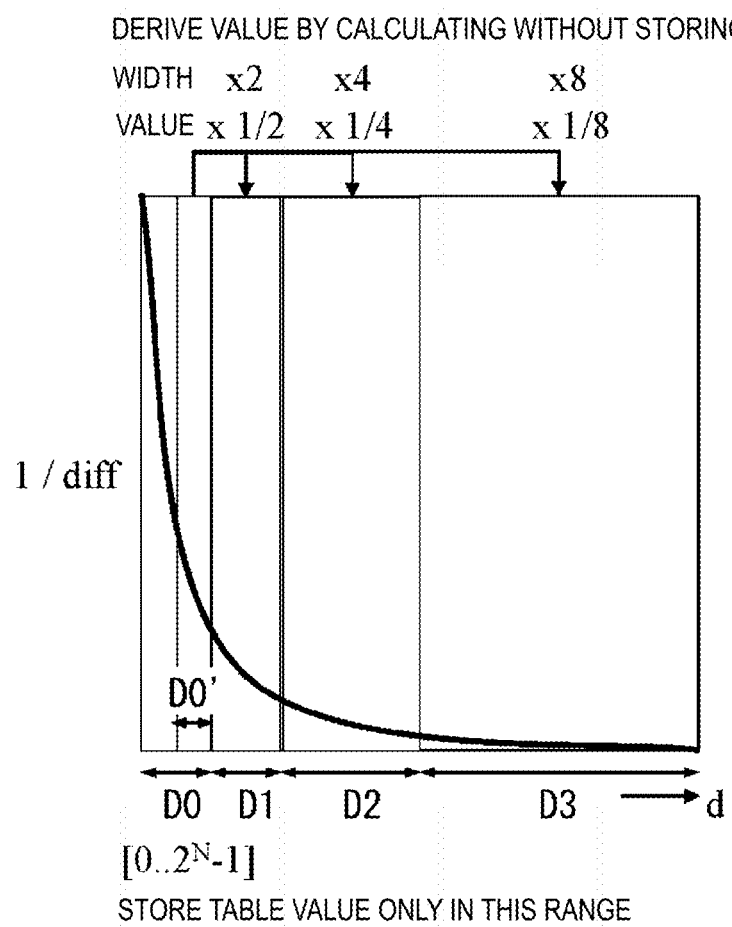
FIG. 17 is a diagram for illustrating an example of calculating a value of an element not stored in a table.

Specifically, the description will be given with reference to FIG. 17. FIG. 17 is a diagram for illustrating the example of calculating the value of the element not stored in the table. In this example, the value of N is N=3. As illustrated in FIG. 17, the CCLM prediction parameter derivation unit 310442, uses a value of the table LMDivTable_2N as it is in a section D0[0 . . . $2^N-1$] (e.g., 0 . . . 7) of d stored in the table LMDivTable_2N; uses a value which is ½ of the value in a section D0'[$2^N/2$ . . . $2^{(N+1)}-1$] (e.g., 4 . . . 7) in the latter half of D0 of the table LMDivTable_2N, in the next section D1[$2^N$ . . . $2^{(N+1)}-1$] (e.g., 8 . . . 15); uses a value which is ¼ of the value of the section D0' (e.g., 4 . . . 7) of the table LMDivTable_2N, in the further next section D2[$2^{(N+1)}$ . . . $2^{(N+2)}-1$] (e.g., 16 . . . 31); and uses a value which is ⅛ of the value of the section D0' (e.g., 4 . . . 7) of the table LMDivTable_2N, in the further next section D3[$2^{(N+2)}$ . . . $2^{(N+3)}-1$] (e.g., 32 . . . 63) thereof as well. Additionally, the section D1 has a width twice the width of the section D0', the section D2 has a width four times the width of the section D0', and the section D3 has a width eight times the width of the section D0'. That is, each value of a section Dsc[$2^{(N+sc-1)}$ . . . $2^{(N+sc)}-1$] is a value obtained by multiplying the value of the section D0'[$2^N/2$ . . . $2^{(N+1)}-1$] by 1/k (here, k=$2^{sc}$), and the same value is stored for each k pieces from the first of the section Dsc. Note that the value of sc satisfies 1<=sc<=6. 6 is derived from 9−3, 9 indicates the precision of diff, and 3 is determined by D1 starting from 8 (=$2^3$).

For example, in a case of N=3, the values after d (=diff−1)=8 are calculated by multiplying the value of the section D0'[4 . . . 7] by 1/k as described below.

Section [8 . . . 15]→½
Section [16 . . . 31]→¼
Section [32 . . . 63]→⅛
Section [64 . . . 127]→ 1/16
Section [128 . . . 255]→ 1/32
Section [256 . . . 511]→ 1/64

TABLE 1

| Section | Range of d | k | sc |
| --- | --- | --- | --- |
| D1 | [8 . . . 15] | 1/2 | 1 |
| D2 | [16 . . . 31] | 1/4 | 2 |
| D3 | [32 . . . 63] | 1/8 | 3 |
| D4 | [64 . . . 127] | 1/16 | 4 |
| D5 | [128 . . . 255] | 1/32 | 5 |
| D6 | [256 . . . 511] | 1/64 | 6 |

Figure 18:
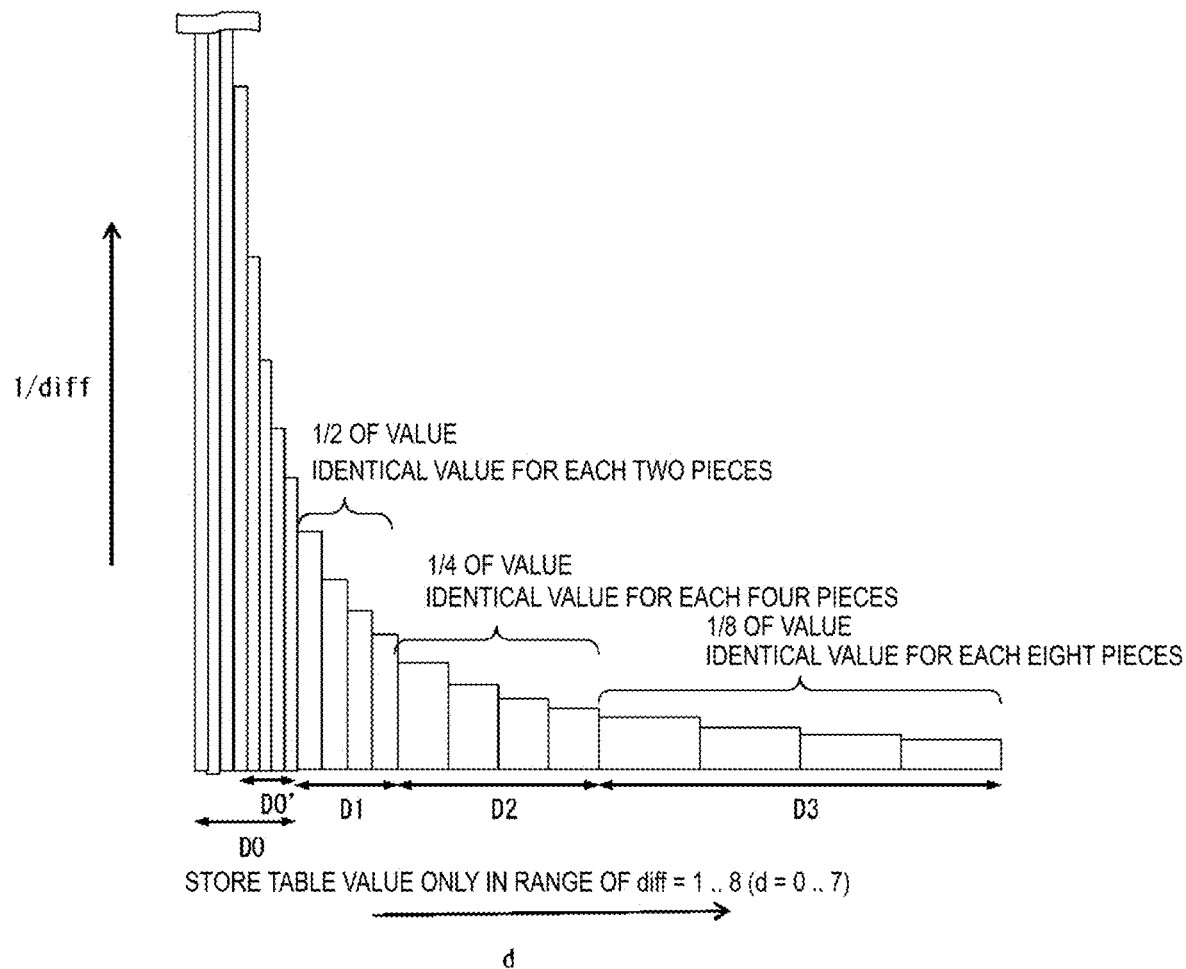
FIG. 18 is a diagram for illustrating the example of calculating the value of the element not stored in the table.

More particularly, as illustrated in FIG. 18, the calculation is performed with reference to LMDivTable_2N such that k identical values continue in a range in which the value is multiplied by 1/k, in such a manner that d=8, 9 are ½ of d=4, d=10, 11 are ½ of d=5, d=12, 13 are ½ of d=6, d=14, 15 are ½ of d=7, d=16, 17, 18, 19 are ¼ of d=4, and d=20, 21, 22, 23 are ¼ of d=5 . . . (the same applies hereinafter). That is, LMDivTable_2N is referred to by using d/k. Hereinafter, k is referred to as a scale, and sc=log 2(k) is referred to as a scale shift value.

Specifically, in a case of expressing as equations, as described below, by using the derived k, the inverse number table LMDivTable_2N is referred to with LMDivTable_2N[d/k]/k (=LMDivTable_2N[d>>sc]>>sc).

$$sc=(9-N)-clz(d>>N,9-N)$$

$$k=2^{\wedge}(sc)$$

Note that "9" is because the precision (the number of bits) of diff is 512 elements (9 bits), and in a case of different precision, a different values is assigned.

The CCLM prediction unit 31044 derives the CCLM prediction parameter a, by using a value obtained by shifting, by sc, a value of the table DivTableM referred to with a value (d>>sc), and the chroma difference ChromaDelta. Here, d (=diff−1) is the luma difference. sc is a prescribed scale shift value depending on d.

$$a=(ChromaDelta*(LMDivTable\_2N[d>>sc])>>sc)+\\ add)>>shiftB$$

$$b=C\_MIN-((a*Y\_MIN)>>shiftA)$$

Here, add=(shiftB>0)?1<<(shiftB−1):0

Alternatively, as described below, in a case of using a configuration in which a 1-bit right shift is always performed in derivation of a round correction term add, a simplification effect of eliminating the branch of whether or not the number of shifts is positive is achieved.

$$add=(1<<shiftB)>>1$$

Note that the position of the shift applied by sc does not depend on the above. The CCLM prediction parameter a may be derived as follows.

$$a=(ChromaDelta*(LMDivTable\_2N[d>>sc])+add)>>\\ (shiftB+sc)$$

$$b=C\_MIN-((a*Y\_MIN)>>shiftA)$$

Here, add=(shiftB+sc>0)?1<<(shiftB+sc−1):0 or $$add=(1<<(shiftB+sc))>>1$$

Note that in the above description, the case of d=0 in division by 1/d was assumed to be excluded, and only a table with d>=1 or greater is used. That is, although the table with d=diff−1 is used rather than d=diff, a table with d=diff may be used.

In other words, as indicated by LMDivTable_2N[d>>sc] described above, by referring to the inverse number table LMDivTable_2N with an index (d>>sc) in which the magnitude of the value has been reduced by the shift, an effect is obtained in which the number of elements of LMDivTable_2N is reduced and the table size is reduced. In addition, by adjusting the magnitude by further performing right shift of the value of the inverse number table LMDivTable_2N such as LMDivTable_2N[d>>sc]>>sc and (LMDivTable_2N[d>>sc]+add)>>(shiftB+sc), the effect of reducing table size without reducing performance is obtained.

Modification of Processing Example 3

In the above-described embodiment, by configuring the table for d=diff−1, reducing the number of elements stored in the table, and deriving elements that is not stored by calculation, the required memory has been reduced. In the present modification, an example in which a table for diff (0<=diff<=511) is configured and the required memory is reduced will be described. In the following, the difference with respect to Processing Example 3 is described.

For example, in a case that the number of elements of the table is 2^N and the value of N is N=5, Table 1 is associated as shown in Table 2.

TABLE 2

| Section | diff | k | sc | Range (diff/32) | idx | exp | iShift (16-exp) |
|---|---|---|---|---|---|---|---|
| D0 | 0 . . . 31 | 1 | 0 | 0 | 0 . . . 31 | 13 . . . 18 | 3 . . . 8 |
| D1 | 32 . . . 63 | ½ | 1 | 1 | 16 . . . 31 | 9.8 | 7.8 |
| D2 | 64 . . . 127 | ¼ | 2 | 2 . . . 3 | 16 . . . 31 | 9.8 | 7.8 |
| D3 | 128 . . . 255 | ⅛ | 3 | 4 . . . 7 | 16 . . . 31 | 9.8 | 7.8 |
| D4 | 256 . . . 511 | 1/16 | 4 | 8 . . . 15 | 16 . . . 31 | 9.8 | 7.8 |
| D5 | 512 | 1/32 | 5 | 16 | 16 | 9 | 7 |

Specifically, in a case of expressing as equations, as described below, by using the derived k, the inverse number table LMDivTable_2N' is referred to with LMDivTable_2N'[d/k]/k (=LMDivTable_2N[d>>sc]>>sc). LMDivTable_2N'[ ] is a table in which "0" is inserted at the first of LMDivTable_2N[ ] and the last element is deleted.

$$range=diff>>N$$

$$sc=ShiftTableE''\_2N[range+1]$$

$$k=2^{\wedge}(sc)$$

ShiftTableE"_2N[ ] is a table in which"0" is inserted at the first of ShiftTableE'2N[ ].

ShiftTableE"_2N[ ]={0, 0, 1, 2, 2, 3, 3, 3, 3, 4, 4, 4, 4, 4, 4, 4, 4, 5, 5, 5, 5, 5, 5, 5, 5, 5, 5, 5, 5, 5, 5, 5, . . . }

The CCLM prediction unit 31044 derives the CCLM prediction parameter a, by using a value in which a value of the table LMDivTable_2N' referred to with a value (diff>>sc) obtained by shifting the luma difference diff by a prescribed scale shift value sc depending on diff is further shifted by sc, and the chroma difference ChromaDelta.

$$a=(ChromaDelta*(LMDivTable\_2N'[diff>>sc])>>sc)+\\ add)>>shiftB$$

$$b=C\_MIN-((a*Y\_MIN)>>shiftA)$$

Here, add=(shiftB>0)?1<<(shiftB−1):0 or $$add=(1<<shiftB)>>1$$

LMDivTable_2N'[ ] is a table in which "0" is inserted at the first of LMDivTable_2N'[ ] and the last element is deleted.

The effect of Processing Example 3 and the effect of this modification are the same.

Processing Example 4

The CCLM prediction parameter derivation unit 310442 may perform processing by combining Processing Examples 1 to 3 described above. In this case, the CCLM prediction parameter derivation unit 310442 derives the scale shift value sc corresponding to the luma difference value (d), derives a value (DivTableM_2N[d>>sc]) of the table DivTableM_2N referred to by using a value d>>sc obtained by performing right shift of the luma difference value (d) by sc as an index (element position), and further derives the CCLM prediction parameter by multiplying a value r and the chroma difference value. Here, the value r is obtained by shifting by a value exp and sc. And the value exp corresponds to the exponent part of d>>sc described above. The CCLM prediction parameters (a, b) are derived in accordance with the following equations.

$a=(ChromaDelta*r+add)>>shiftB$ $b=MinChromaValue-((a*MinLumaValue)>>shiftA)$ $d=diff-1$ $sc=(D-N)-clz(d>>N,D-N)$ $exp=clz(d>>sc,N)+(16-N-(P-1))$ $r=(DivTableM\_2N[d>>sc]+offsetM)<<exp>>sc$ $add=(shiftB>0)?1<<(shiftB-1):0$ In a case that an offset is used (in a case that 2^N pieces from the first of the table are to be stored), offsetM=2^(P−1) is used. In a case of not using, offsetM=0 is used.

Here,

D: Indicating a range of values of diff (1 . . . 2^D), D=9 is used in Processing Example 1 to Processing Example 3

N: An integer indicating log 2 of the number of elements of DivTable, 0<N<=D

P: The number of bits of the significand of a value obtained by exponential expression, a value obtained by multiplying 1/diff by an integer (2^16), 0<=P−1<=16−N. Note that the order of processing the scale shift value sc and the exponent shift value exp is not limited to the above. For example, the CCLM prediction parameter derivation unit 310442 derives sc corresponding to the luma difference value (d), and derives the CCLM prediction parameter by shifting a value obtained by multiplying DivTableM_2N [d>>sc] and the chroma difference value, by a shift value (shiftB+sc−exp) derived from exp and sc. Here, DivTableM_2N[d>>sc] is obtained by table reference using the value d>>sc as an index (element position). d>>sc is obtained by right shifting of the luma difference value (d).

$a=(ChromaDelta*r+add)>>(shiftB+sc-exp)$ $b=MinChromaValue-((a*MinLumaValue)>>shiftA)$ $d=diff-1$ $sc=(D-N)-clz(d>>N,D-N)$ $exp=clz(d>>sc,N)+(16-N-(P-1))$ $r=(DivTableM\_2N[d>>sc]+offsetM)$ $add=(shiftB+sc-exp>0)?1<<(shiftB+sc-exp-1):0$ offsetM=2^(P−1), or 0

Additionally, the value of ChromaDelta may be normalized previously using the shift value shiftB.

$a=((ChromaDelta+add)>>shiftB)*r>>(sc-exp)$

Example of Table Value

Examples of table values are as follows.

Example 1: A Case of N=6, P=5, and Using an Offset OffsetM of 2^(P−1)

DivTableM_2N[64]={0, 0, 5, 0, 10, 5, 2, 0, 12, 10, 7, 5, 4, 2, 1, 0, 14, 12, 11, 10, 8, 7, 6, 5, 4, 4, 3, 2, 2, 1, 1, 0, 15, 14, 13, 12, 12, 11, 10, 10, 9, 8, 8, 7, 7, 6, 6, 5, 5, 4, 4, 4, 3, 3, 3, 2, 2, 2, 1, 1, 1, 1, 0, 0}
ShiftTableE_2N[64]={12, 11, 10, 10, 9, 9, 9, 9, 8, 8, 8, 8, 8, 8, 8, 8, 7, 7, 7, 7, 7, 7, 7, 7, 7, 7, 7, 7, 7, 7, 7, 7, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6, 6}

Example 1 Modification: In a case that the method of rounding into an integer is different, the following table may be used.

DivTableM_2N[64]={0, 0, 5, 0, 10, 5, 2, 0, 12, 10, 7, 5, 4, 2, 1, 0, 14, 12, 11, 10, 8, 7, 6, 5, 4, 4, 3, 2, 2, 1, 1, 0, 15, 14, 14, 13, 12, 11, 11, 10, 9, 9, 8, 8, 7, 7, 6, 6, 5, 5, 4, 4, 4, 3, 3, 3, 2, 2, 2, 1, 1, 1, 1, 0}

ShiftTableE_2N is common to Example 1.

In a case of N=6, P=5, the amount of memory required to store the table is (5−1)*2^6=4*64=256 (bits). In comparison with the above-described embodiment, 256/16896=1.515% is achieved, the amount of memory can be significantly reduced.

Example 2: A Case of N=5, P=5, and Using an Offset of 2^(P−1)

DivTableM_2N[32]={0, 0, 5, 0, 10, 5, 2, 0, 12, 10, 7, 5, 4, 2, 1, 0, 14, 12, 11, 10, 8, 7, 6, 5, 4, 4, 3, 2, 2, 1, 1, 0}
ShiftTableE_2N[32]={12, 11, 10, 10, 9, 9, 9, 9, 8, 8, 8, 8, 8, 8, 8, 8, 7, 7, 7, 7, 7, 7, 7, 7, 7, 7, 7, 7, 7, 7, 7, 7}

At this time (N=5, P=5, D=9, with the offset), the derivable equations of a and b are summarized as follows.

$d=diff-1$ $sc=(D-N)-clz(d>>N,D-N)=(9-5)-clz(d>>5,9-5)=4-clz(d>>5,4)$ $exp=clz(d>>sc,N)+(16-N-(P-1))=clz(d>>sc,5)+(16-5-(5-1)=clz(d>>sc,5)+7$ $offsetM=2^{\wedge}(P-1)=2^{\wedge}(5-1)=16$ $r=(DivTableM\_2N[d>>sc]+offsetM)=DivTableM\_2N[d>>sc]+16$ $add=(shiftB+sc-exp>0)?1<<(shiftB+sc-exp-1):0$ are calculated, $a=(ChromaDelta*r+add)>>(shiftB+sc-exp)$ $b=MinChromaValue-((a*MinLumaValue)>>shiftA)$ At this time, in a case that ShiftTableE_2N is used instead of clz, a and b are determined as follows.

$d$=diff−1

$sc$=($D$−$N$)−$clz$($d$>>$N$,$D$−$N$)=($D$−$N$)−(($D$−$N$)−(16−($P$−1)−ShiftTable$E$_2$N$[$d$>>5]))=4−(4−(16−4)−ShiftTable$E$_2$N$[$d$>>5]))=12−ShiftTable$E$_2$N$[$d$>>5]

exp=ShiftTable$E$_2$N$[$d$>>5]

offset$M$=2^($P$−1)=2^(5−1)=16

$r$=(DivTable$M$_2$N$[$d$>>$sc$]+offset$M$)=DivTable$M$_2$N$[$d$>>$sc$]+16 add=(shift$B$+$sc$−exp>0)?1<<(shift$B$+$sc$−exp−1):0 are calculated, $a$=(ChromaDelta*$r$+add)>>(shift$B$+$sc$−exp)

$b$=MinChromaValue−(($a$*MinLumaValue)>>shift$A$)

Example 2 Modification: In a case that the method of rounding into an integer is different, the following table may be used.

DivTableM_2N[32]={0, 0, 5, 0, 10, 5, 2, 0, 12, 10, 7, 5, 4, 2, 1, 0, 14, 13, 11, 10, 9, 8, 7, 6, 5, 4, 3, 3, 2, 1, 1, 0}

ShiftTableE_2N is common to Example 2.

Note that in a case of not using the offset (offsetM=0), a value obtained by adding 2^(P−1) beforehand to each element of DivTableM_2N with the offset described above is stored.

Example 3: A Case of N=6, P=4, and Using an Offset of 2^(P−1)

DivTableM_2N[64]={0, 0, 3, 0, 5, 3, 1, 0, 6, 5, 4, 3, 2, 1, 1, 0, 7, 6, 5, 5, 4, 4, 3, 3, 2, 2, 1, 1, 1, 1, 0, 0, 7, 7, 7, 6, 6, 5, 5, 5, 4, 4, 4, 4, 3, 3, 3, 3, 2, 2, 2, 2, 2, 1, 1, 1, 1, 1, 1, 1, 0, 0, 0, 0}

ShiftTableE_2N[64]={13, 12, 11, 11, 10, 10, 10, 10, 9, 9, 9, 9, 9, 9, 9, 9, 8, 8, 8, 8, 8, 8, 8, 8, 8, 8, 8, 8, 8, 8, 8, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7, 7}

Example 3 Modification: In a case that the method of rounding into an integer is different, the following table may be used.

DivTableM_2N[32]={0, 0, 3, 0, 5, 3, 1, 0, 6, 5, 4, 3, 2, 1, 1, 0, 7, 6, 6, 5, 4, 4, 3, 3, 2, 2, 2, 1, 1, 1, 1, 0}

ShiftTableE_2N is common to Example 3.

Example 4: A Case of N=5, P=4, and Using an Offset of 2^(P−1)

DivTableM_2N[32]={0, 0, 3, 0, 5, 3, 1, 0, 6, 5, 4, 3, 2, 1, 1, 0, 7, 6, 5, 5, 4, 4, 3, 3, 2, 2, 1, 1, 1, 1, 0, 0}

ShiftTableE_2N[32]={13, 12, 11, 11, 10, 10, 10, 10, 9, 9, 9, 9, 9, 9, 9, 9, 8, 8, 8, 8, 8, 8, 8, 8, 8, 8, 8, 8, 8, 8, 8, 8,}

Example 4 Modification: In a case that the method of rounding into an integer is different, the following table may be used.

DivTableM_2N[32]={0, 0, 3, 0, 5, 3, 1, 0, 6, 5, 4, 3, 2, 1, 1, 0, 7, 6, 6, 5, 4, 4, 3, 3, 2, 2, 2, 1, 1, 1, 1, 0}

ShiftTableE_2N is common to Example 4.

In a case of N=5, P=4, the amount of memory required to store the table is (4−1)*2^5=3*32=96 (bits). In comparison with the case described in the embodiment described above, 96/16896=0.568% is achieved, the amount of memory can be significantly reduced.

The table described above may be used in Processing Examples 5 and 6 described below.

Processing Example 5

In Processing Example 5, an example in which the precision shiftA of the parameter a is made variable in the equation (CCLM-1) will be described. Specifically, the precision shiftA of the parameter a is derived in accordance with the shift value exp derived from the luma difference value diff.

Hereinafter, the CCLM prediction parameter derivation unit 310442 derives, from the luma difference value diff and a chroma difference value diffC, a term (diffC/diff) corresponding to the gradient of the linear prediction as a parameter a (here, in order to make the parameter a an integer, a value multiplied by 2^shiftA (=1<<shiftA) is derived).

First, the CCLM prediction parameter derivation unit 310442 derives a number v corresponding to the significand of the inverse number of diff through the method described above.

$idx$=diff>>$sc$ exp=16−($P$−1)−ceil(log 2($idx$))−$sc$ $msb$=1<<($P$−1)

$v$=DivTable_2$N'$[$idx$]|$msb$

Here, P is a prescribed constant (e.g., P=4) corresponding to the number of bits of the significand of the inverse number table (1/diff). Additionally, exp is a variable that decreases as the luma difference diff increases (variable that decreases in proportion to the logarithmic value of diff), and may be derived by the table. Note that in a case of idx=0, log 2(idx) is configured to 0. Here, the reason for obtaining the value of exp by subtracting another value from 16 is that the inverse number table is created based on (2^16)/diff. Hereinafter, the reference bit width of the inverse number table is referred to as baseA. In a case that the bit width of the parameter a is not adjusted, shiftA=baseA is established. Note that the maximum value of v is (1<<P)−1, and the number of bits of v is P bits.

exp=16−($P$−1)−ShiftTable$E''$_2$N$[$idx$]−$sc$

In a case of deriving the parameter a by the product of diffC and v, the CCLM prediction parameter derivation unit 310442 adjusts the number of bits of the parameter a by further performing right shift by shift_a as described below.

add=(1<<shift_$a$)>>1

$a$=(diffC*$v$+add)>>shift_$a$ $b$=C_Y_MIN−(($a$*Y_MIN)>>shift_$a$)

Here, shift_a is a value derived from the bit depth bitDepth of the image. expC is a constant for limiting the bit width of the parameter a, and 0 to 3 are used, for example. The bit width of the parameter a is "the bit width of diffC"+"the bit width of v"−shift_a, is bitDepth+P−(bitDepth−8−expC)=P+8−expC, and is reduced to a small value not depending on the bit depth of the image. For example, in a case of P=4, expC=3, the bit width of a is 9 bits.

shift_$a$=bitDepth−8−exp $C$

The CCLM prediction parameter derivation unit 310442 adjusts the value of shiftA by subtracting the values exp derived using the luma difference diff and expC from the initial value of shiftA (=baseA, e.g., 16).

$$\text{shift}A = 16 - (\exp + \exp C)$$

The CCLM prediction filter unit 310443 outputs the prediction image predSamples[ ][ ] using the CCLM prediction parameters (a, b) and shiftA after adjustment described above, by using the equation (CCLM-1).

In this way, by adaptively deriving the shift amount of a using the luma difference diff and the bit depth bitDepth, the bit width of a used for the derivation of b or the generation of the prediction image predSamples[ ][ ] can be reduced. This provides the effect of simplifying the product of a and the luma value refSamples[ ][ ] in the equation (CCLM-1).

In Processing Example 5, the product of diffC*v in the derivation of a is reduced to 11 bits*P bits from 11 bits*16 bits in Processing Example 1, and thus the effect of simplifying the product is obtained. In a case of P=4, 11 bits*4 bits=15 bits is obtained.

In Processing Example 5, the product of a*Y_MIN in the derivation of b is reduced to P+8−expC bits*10 bits from 27 bits*10 bits in Processing Example 1, and thus the effect of simplifying the product is obtained. In a case of P=4 and expC=3, 9 bits*4 bits=13 bits is obtained.

In Processing 5, the product of the equation (CCLM-1) is reduced to P+8−expC bits*10 bits from 27 bits*10 bits in Processing Example 1, and thus the effect of simplifying the product is obtained. In a case of P=4 and expC=3, 9 bits*4 bits=13 bits is obtained.

Note that expC of Processing Example 5 is a constant that does not depend on the chroma difference unlike Processing Example 6, and thus may be referred to as expConst and the like instead of expC.

Processing Example 6

In Processing Example 6, an example in which the precision shiftA of the parameter a used for the product with the luma value is made variable in the equation (CCLM-1) will be described. Specifically, the upper limit of the number of bits of a (value range of a) is configured to max_a_bits, and the precision shiftA of the parameter a is derived in accordance with diffC, which is the chroma difference (C_Y_MAX−C_Y_MIN). Note that the parameter a may be interpreted as an example of being represented by a mantissa with the fixed number of bits and a power of two. Hereinafter, the number of bits of the significand of a is denoted by max_a_bits, and the number of bits of the exponent part is denoted by expC.

Hereinafter, the CCLM prediction parameter derivation unit 310442 derives (diffC/diff*2^shiftA) corresponding to the gradient from the denominator (luma difference value) diff and the numerator (chroma difference value) diffC, as the parameter a. Hereinafter, the parameter a is multiplied by 2^shiftA (that is, 1<<shiftA) in order to make it an integer.

First, the CCLM prediction parameter derivation unit 310442 derives idx for referring to the compressed inverse number table DivTable_2N' from diff, and further derives a number v corresponding to the inverse number of diff.

$$\text{diff} = Y\_MAX - Y\_MIN$$

$$\text{range} = >> N) + 1$$

$$sc = \text{ceil}(\log 2(\text{range}))$$

$$idx = \text{diff} >> sc$$

Here, N is a prescribed constant, for example, 5.

$$msb = 1 << (P-1)$$

$$v = \text{DivTable}\_2N'[idx] | msb$$

Here, P is the number of bits of the significand (part stored in the DivTable_2N' table) of the inverse number table (1/diff), and msb is offsetM.

The CCLM prediction parameter derivation unit 310442 derives the shift value exp corresponding to the luma difference value diff.

$$\exp = 16 - (P-1) - \text{ceil}(\log 2(\text{diff}+1)) = 16 - (P-1) - \text{ceil}(\log 2(idx)) - sc$$

Additionally, exp may be derived with reference to the table.

$$\exp = 16 - (P-1) - \text{ShiftTable}E''\_2N[idx] - sc$$

The CCLM prediction parameter derivation unit 310442 derives the shift value expC corresponding to the logarithmic value of an absolute value absDiffC of the chroma difference value diffC.

$$\text{diffC} = C\_Y\_MAX - C\_Y\_MIN$$

$$\text{absDiffC} = (\text{diffC} < 0 ? -\text{diffC} : \text{diffC})$$

$$\text{rangeDiffC} = (\text{absDiffC} >> (\text{max\_a\_bits} - P - 1))$$

$$\exp C = \text{ceil}(\log 2(\text{rangeDiffC}+1))$$

Here, a configuration in which the value of max_a_bits is configured to P+1 is also preferable, and in this case, since rangeDiffC=absDiffC is established, the CCLM prediction parameter derivation unit 310442 derives expC as follows without rangeDiffC.

$$\exp C = \text{ceil}(\log 2(\text{absDiffC}+1))$$

In a case of deriving the parameter a by the product of diffC and v, the CCLM prediction parameter derivation unit 310442 derives the parameter a whose number of bits is limited, by further performing right shift of diffC*v by expC as described below.

$$\text{add} = (1 << \exp C) >> 1$$

$$a = (\text{diffC}*v + \text{add}) >> \exp C$$

$$b = C\_Y\_MIN - ((a*Y\_MIN) >> \exp C) // \text{shift}\_a = \exp C$$

The CCLM prediction parameter derivation unit 310442 adjusts the value of shiftA by subtracting exp derived using the denominator (luma difference value diff) and expC derived using the numerator (chroma difference value diffC) from the initial value of shiftA (e.g., 16).

$$\text{shift}A = 16 - (\exp + \exp C)$$

For example, in the case of max_a_bits=5, a is expressed with the precision of 5 bits (−16 to 15). Furthermore, expC is a variable that increases as the absolute value of the chroma difference diffC increases (variable that increases in proportion to the logarithmic value of absDiffC).

$$\exp C = \text{ceil}(\log 2(\text{rangeDiffC}))$$

Note that in a case of rangeDiffC=0, expC=0 is configured. expC may be derived with reference to the table.

$$\exp C = \text{ShiftTable}E''\_2N[\text{rangeDiffC}+1]$$

The CCLM prediction filter unit 310443 outputs the prediction image predSamples[ ][ ] using the CCLM prediction parameters (a, b) and shiftA after adjustment described above, by using the equation (CCLM-1).

In this way, by adaptively deriving the shift amount of a from the chroma difference diffC, the bit depth of a can be reduced. This provides the effect of simplifying the product of a and the luma value refSamples[ ][ ] in the equation (CCLM-1), while suppressing deterioration in precision.

In Processing Example 6, the product of diffC*v in the derivation of a is reduced to 11 bits*P bits from 11 bits*16 bits in Processing Example 1, and thus the effect of simplifying the product is obtained. In a case of P=4, 11 bits*4 bits=15 bits is obtained.

In Processing Example 6, the product of a*Y_MIN in the derivation of b is reduced to max_a_bits bits*10 bits from 27 bits*10 bits in Processing Example 1, and thus the effect of simplifying the product is obtained. In a case of max_a_bits=5, 5 bits*10 bits=15 bits is obtained.

In Processing 6, the product of the equation (CCLM-1) is reduced to max_a_bits bits*10 bits from 27 bits*10 bits in Processing Example 1, and thus the effect of simplifying the product is obtained. In a case of max_a_bits=5, 5 bits*10 bits=15 bits is obtained.

Processing Example 7

Hereinafter, processing in which Processing Examples 1 to 3 (Processing Example 4) focusing on table reduction and Processing Examples 2, 5 and 6 focusing on bit width reduction are combined will be described as Processing Example 7. The contents that have already been described will be partially omitted and described briefly. In addition, shiftB for limiting diff to a prescribed number of bits is configured to 0. A method for deriving the CCLM prediction parameters a and b is described below. Note that in a case of C_Y_MAX=C_Y_MIN, a=0, b=C_Y_MIN are configured.

The CCLM prediction parameter derivation unit 310442 derives, from the luma difference value diff, an index idx for referring to an inverse number table DivTableM_2N' and a variable exp for adjusting the precision, and derives a value v corresponding to the inverse number of diff.

$shiftA = baseA = 16$ $diff = Y\_MAX - Y\_MIN$ $range = diff >> N$ $sc = ceil(log\ 2(range+1))$ $idx = diff >> sc$ $exp = baseA - (P-1) - ceil(log\ 2(idx)) - sc$ $msb = 1 << (P-1)$ $v = (DivTableM\_2N'[idx] | msb)$ Here, baseA is the number of bits (e.g., 16) which serves as the reference at the time of deriving the inverse number table DivTableM_2N'[idx], N is a constant corresponding to the number of elements ($2^N$) of DivTableM_2N', P is a constant corresponding to the number of bits of the significand of ($2^{16}$/diff) in an exponential notation based on 2, and max_a_bits is a constant corresponding to the number of bits of the significand of a in an exponential notation based on 2. msb is also a constant. For example, N=5, P=4, max_a_bits=5, and msb=$2^{(P-1)}$=8 may be used. In a case of msb=$2^{(P-1)}$ (with an offset), an example of DivTableM_2N'[ ] is as follows.

DivTableM_2N'[32]={0, 0, 0, 3, 0, 5, 3, 1, 0, 6, 5, 4, 3, 2, 1, 1, 0, 7, 6, 5, 5, 4, 4, 3, 3, 2, 2, 1, 1, 1, 1, 0}

The CCLM prediction parameter derivation unit 310442 derives the variable expC for adjusting the bit width of the parameter a from the chroma difference value diffC.

$max\_a\_bits = 5$ $diffC = C\_Y\_MAX - C\_Y\_MIN$ $absDiffC = (diffC < 0\ ?\ -diffC : diffC)$ $rangeDiffC = (absDiffC >> (max\_a\_bits - P - 1))$ $exp\ C = ceil(log\ 2(rangeDiffC+1))$ $shift\_a = exp\ C$ The CCLM prediction parameter derivation unit 310442 derives the parameter a whose number of bits is limited, by further performing right shift of diffC*v by shift_a as described below.

$add = 1 << shift\_a >> 1$ $a = (diffC*v + add) >> shift\_a$

In this configuration, since shift_a=expC is established, the derivation equations for a and b can be replaced with the following equations.

$add = (1 << exp\ C) >> 1$ $a = (diffC*v + add) >> exp\ C$

As a result, the bit width (precision) of a can be kept constant without depending on the magnitude of diffC.

The CCLM prediction parameter derivation unit 310442 adjusts the value of shiftA by subtracting exp derived using diff and expC derived using diffC from the initial value of shiftA (e.g., 16).

$shiftA -= exp + exp\ C$

Furthermore, in a case that the initial value is 16, shiftA may be derived as follows.

$shiftA = 16 - exp - exp\ C$

Incidentally, since the initial value baseA of shiftA is also used to derive expC and mutually canceled out, as a result, the shiftA may be directly derived using the constant P, idx, and rangeDiffC.

$shiftA = baseA - (baseA - (P-1) - ceil(log\ 2(idx)) - sc) - ceil(log\ 2(rangeDiffC+1)) = P - 1 + ceil(log\ 2(idx)) + sc - ceil(log\ 2(rangeDiffC+1))$ The CCLM prediction parameter derivation unit 310442 derives the parameter b by using the parameter a whose bit width is adjusted.

$b = C\_Y\_MIN - ((a*Y\_MIN) >> shiftA)$

The CCLM prediction filter unit 310443 outputs the prediction image predSamples[ ][ ] using the CCLM prediction parameters (a, b) and shiftA after adjustment described above, by using the equation (CCLM-1).

Note that as described in Processing Example 6, expC may be a prescribed constant without depending on diffC. Note that expC has a value less than the value obtained by adding P (the number of bits of the significand of ($2^{16}$/diff) in exponential notation based on 2) to the bit depth bitDepth of the image. For example, in a case of bitDepth=10 and P=4, expC is less than 14.

$exp\ C < bitDepth + P$

With this, although the precision of a is slightly reduced, the processing can be simplified.

According to the above-described configuration, the effects described in Processing Examples 1 to 3, 5, and 6 are obtained. Describing the main effects again, at least the following effects can be obtained.

As described in Processing Example 3, the effect of simplifying by table size reduction by referring to the table by diff>>sc can be obtained.

The effect of simplifying the product by bit width reduction described in Processing Examples 5 and 6 can be obtained.

OTHER EXAMPLES

Note that in each of the processing examples described above, the example has been described in which the amount of memory for storing the table used for the CCLM processing is reduced, but the technical concept of the present invention can also be used to reduce the amount of memory for storing other information and the bit width of multiplication. For example, application to a table used to derive a scaled motion vector is also possible.

A CCLM prediction unit according to an aspect of the present invention is a CCLM prediction unit configured to generate a prediction image by a CCLM prediction, the CCLM prediction unit including: a CCLM prediction parameter derivation unit configured to derive CCLM prediction parameters (a, b) by using a luma difference value, a chroma difference value, and a table; and a CCLM prediction filter unit configured to generate a chroma prediction image by using a luma reference image and the CCLM prediction parameters (a, b), in which the CCLM prediction parameter derivation unit derives the CCLM prediction parameter a by shifting a value obtained by multiplying an element of a table referred to by the luma difference value and the chroma difference value.

In the CCLM prediction unit according to the aspect of the present invention, the CCLM prediction parameter derivation unit may derive a luma difference value from a first pixel at which a luma value of a neighbouring block is maximized and a second pixel at which a luma value of a neighbouring block is minimized, derive a chroma difference value from pixel values of chroma of the first pixel and the second pixel, derive a scale shift value sc corresponding to the luma difference value, multiply a value of a table referred to by an index idx obtained by performing right shift of the luma difference value by sc and the chroma difference value, and derive the CCLM prediction parameter a, by further shifting a value obtained by the multiplication.

In the CCLM prediction unit according to the aspect of the present invention, the CCLM prediction parameter derivation unit may multiply a value obtained by adding an offset to the value of the table referred to by the idx and the chroma difference value.

In the CCLM prediction unit according to the aspect of the present invention, the CCLM prediction parameter derivation unit may derive a first shift value corresponding to a logarithmic value of an absolute difference value of chroma, multiply the value of the table referred to by idx and the chroma difference value, and derive the CCLM prediction parameter a, by further shifting the value obtained by the multiplication by a shift value expC.

In the CCLM prediction unit according to the aspect of the present invention, the CCLM prediction parameter derivation unit may derive a second shift value corresponding to a logarithmic value of a luma difference value diff, and derive the CCLM prediction parameter b by using a chroma value of the second pixel, the CCLM prediction parameter a, a luma value of the second pixel, and the first shift value and the second shift value.

In the CCLM prediction unit according to the aspect of the present invention, the first shift value and the second shift value may be derived with reference to a table.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card) /an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

CROSS-REFERENCE OF RELATED APPLICATION

This application claims the benefit of priority to JP 2018-238526 filed on Dec. 20, 2018, which is incorporated herein by reference in its entirety.

REFERENCE SIGNS LIST

31 Image decoding apparatus
301 Entropy decoding unit
302 Parameter decoding unit
303 Inter prediction parameter decoding unit
304 Intra prediction parameter decoding unit
308 Prediction image generation unit
309 Inter prediction image generation unit
310 Intra prediction image generation unit
3104 Predictor
31044 CCLM prediction unit (prediction image generation apparatus)
310441 Downsampling unit
310442 CCLM prediction parameter derivation unit (parameter derivation unit)
310443 CCLM prediction filter unit
311 Inverse quantization and inverse transform processing unit
312 Addition unit
11 Image coding apparatus
101 Prediction image generation unit
102 Subtraction unit
103 Transform and quantization unit
104 Entropy coding unit
105 Inverse quantization and inverse transform processing unit
107 Loop filter
110 Coding parameter determination unit
111 Parameter coding unit
112 Inter prediction parameter coding unit
113 Intra prediction parameter coding unit

The invention claimed is:

1. A prediction image generation apparatus for generating a prediction image by using an intra prediction parameter including a Cross-Component Linear Model (CCLM) prediction mode, the prediction image generation apparatus comprising:
CCLM prediction parameter circuitry that derives:
(i) a first difference value, which is a difference between chrominance values,
(ii) a first variable by using (a) a second difference value, which is a difference between luminance values, (b) a first logarithmic value derived by using the second difference value, and (c) a right shift operation,
(iii) a shift value by using a second logarithmic value derived by using an absolute value of the first difference value, and
(iv) a CCLM prediction parameter by using (a) the first variable, (b) the first difference value, and (c) the shift value; and
a CCLM prediction filter that derives the prediction image by using the CCLM prediction parameter,
wherein
the CCLM prediction parameter is derived by right shifting a second variable by the shift value, wherein the second variable is a sum of a third variable and a value of a rounding parameter, wherein the third variable is a product of (i) the first difference value and (ii) a value, in a reference table, defined by using the first variable.

2. The prediction image generation apparatus of claim 1, wherein a first value and a last value in the reference table is equal to 0.

3. A video decoding apparatus configured to decode an image by adding a prediction image generated from the CCLM prediction filter according to claim 1 and a residual.

4. A video coding apparatus configured to code a residual from a difference between a prediction image derived from the CCLM prediction filter according to claim 1 and an input image.

5. A prediction image generation method for generating a prediction image by using an intra prediction parameter including a Cross-Component Linear Model (CCLM) prediction mode, the prediction image generation method including:
deriving a first difference value, which is a difference between chrominance values,
deriving a first variable by using (i) a second difference value, which is a difference between luminance values, (ii) a first logarithmic value derived by using the second difference value, and (iii) a right shift operation,
deriving a shift value by using a second logarithmic value derived by using an absolute value of the first difference value, and
deriving a CCLM prediction parameter by right shifting a second variable by the shift value, wherein the second variable is a sum of a third variable and a value of a rounding parameter, wherein the third variable is a product of (i) the first difference value and (ii) a value, in a reference table, defined by using the first variable; and
deriving the prediction image by using the CCLM prediction parameter.

* * * * *